US006663486B2

(12) United States Patent
D'Aurora et al.

(10) Patent No.: US 6,663,486 B2
(45) Date of Patent: Dec. 16, 2003

(54) GAMING SIMULATION PROGRAM PROVIDING SELECTION OF BETTING AND PLAYING STRATEGIES

(75) Inventors: Joseph R. D'Aurora, Canton, OH (US); Jon W. Garaux, East Sparta, OH (US); Douglas R. Garaux, East Sparta, OH (US); Peter S. Lampard, Canton, OH (US)

(73) Assignee: Dream Makers, Inc., Longwood, FL (US)

( * ) Notice: Subject to any disclaimer, the term of this patent is extended or adjusted under 35 U.S.C. 154(b) by 76 days.

(21) Appl. No.: 09/931,310

(22) Filed: Aug. 16, 2001

(65) Prior Publication Data

US 2003/0069054 A1 Apr. 10, 2003

Related U.S. Application Data

(60) Provisional application No. 60/294,483, filed on May 30, 2001.

(51) Int. Cl.[7] .......................... A63F 13/00; A63F 9/24; G06F 17/00; G06F 19/00

(52) U.S. Cl. ............................ 463/12; 463/15; 463/29; 463/40; 463/41; 463/42

(58) Field of Search .............................. 463/40–42, 19, 463/1–8; 273/143 R, 269

(56) References Cited

U.S. PATENT DOCUMENTS

| | | | | | |
|---|---|---|---|---|---|
| 4,856,787 | A | * | 8/1989 | Itkis | 273/237 |
| 5,042,809 | A | | 8/1991 | Richardson | |
| 5,333,868 | A | * | 8/1994 | Goldfarb | 463/18 |
| 5,432,932 | A | * | 7/1995 | Chen et al. | 709/103 |
| 5,586,766 | A | | 12/1996 | Forte et al. | |
| 5,816,917 | A | | 10/1998 | Kelmer et al. | |
| 5,830,067 | A | * | 11/1998 | Graves et al. | 463/40 |
| 5,941,770 | A | * | 8/1999 | Miers et al. | 463/13 |

* cited by examiner

*Primary Examiner*—Stephen Blau
*Assistant Examiner*—Robert Mendoza
(74) *Attorney, Agent, or Firm*—Sand & Sebolt

(57) ABSTRACT

A gaming simulation program providing for user selection of gaming and betting strategies is disclosed. Games which may be simulated by the disclosed invention include war, blackjack, poker, keno, baccarat, etc. The program includes a gaming module and a simulation module. The gaming module allows the user to input a gaming strategy, a betting strategy, a playing mode, a number of iterations of the simulation and a speed of the simulations. The playing modes include single hand mode, automatic mode and session mode. The simulation module executes the simulation of the number of game iterations provided by the user to the gaming module. The gaming program may also include a statistics module which compiles and displays statistics of a game during and at the conclusion of a simulation.

48 Claims, 22 Drawing Sheets

GAMING SIMULATION PROGRAM PROVIDING SELECTION OF BETTING AND PLAYING STRATEGIES

CROSS REFERENCE TO RELATED APPLICATION

This application claims priority under U.S. Provisional Application Serial No. 60/294,483, filed May 30, 2001.

BACKGROUND OF THE INVENTION

1. Technical Field

The present invention relates to a gaming simulation program and more particularly, to a gaming simulation program providing for user selection of gaming and betting strategies.

2. Background Information

A number of computer programs have been developed to permit a user to simulate the playing of various games of chance such as poker, blackjack, bingo and the like. Some programs are available on CD ROM or floppy diskettes and are adapted for installation and use on personal computers. Programs are also burned into integrated circuit memory chips installed in hand held electronic devices. Computer programs and hand held devices programed to simulate games of chance conveniently permit the user to simulate the playing of sequential hands or rounds of a selected game of chance and track the results of playing a given number of hands by displaying, for example, a running total of the user's "bankroll," i.e., how much "money" the user has at any given time assuming the user started the playing session with an initial bankroll.

Lacking in prior art gaming simulation programs and devices is the ability to simulate the results of playing multiple rounds or hands of a selected game of chance using both a selected betting strategy and a selected playing strategy and displaying simulation result statistics so the user can intelligently analyze different combinations of playing and betting strategies.

What is needed is a gaming program and method for its use that allows the user to select between different games of chance and, for a selected game of chance, to further select a betting strategy from a set of betting strategies and a playing strategy from a set of playing strategies and to simulate the playing of a plurality of hands using the selected betting and playing strategies. What is further needed is a gaming program and method for its use that provides comprehensive statistics to enable a user to determine the results of the simulation of a plurality of hands using the selected betting and playing strategies to enable the user to determine the relative merits of the selected strategy vis-a-vis other strategies. What is further needed is a gaming program and method of use to enable a user to be taught various strategies and techniques in playing various games of chance and to enhance his skill in employing such strategies and techniques. What is also needed is a gaming program and method for its use that is relatively inexpensive and easy to use.

SUMMARY OF THE INVENTION

The present invention concerns a gaming simulation computer program for use on a personal computer. The program provides for user selection of both gaming and betting strategies. A betting strategy is a decision rule for deciding how much to bet on any given hand or game. For example, a simple betting strategy would be: if I won the last hand, I will double my previous et on the next hand, and if I lost the last hand, I will reduce my previous bet by half on the next hand. A gaming strategy is a decision rule or rules selecting a course of action to be taken when a non-betting amount question arises. For example, in the card game known as war, in a first hand, if the dealer and the player are both dealt cards that have the same numeric value, the player must choose to either surrender or not surrender. If the gaming strategy decision rule selected by the player is to surrender, the player loses one half of his or her current bet and a new hand is dealt. If the gaming strategy decision rule selected by the player is to not surrender, the player puts up additional money to match his current bet while the dealer does not. A second hand is dealt, the player and the dealer each receiving a card, the winner (i.e., the person receiving the card with the higher numeric value) of the new hand takes all of the money put up in the first and second hands.

In one operating embodiment of the present invention, the single step mode, the user selects a betting strategy and a playing strategy, selects a starting bankroll and determines the number of rounds or hands to be simulated. The simulation program, operating in single step mode, allows the user to step through the simulated playing of the hands on a one at a time basis prompting each hand to be played with a keystroke. Statistics are collected during the simulation gaming session. Upon completion of the simulation gaming session, statistics summarizing the results of the simulation are selectively displayed to the viewer, including occurrences of winning and losing streaks of different lengths and maximum and minimum bankroll values.

In a second operating embodiment of the present invention, the automatic mode, the user selects a betting strategy and a playing strategy, selects a starting bankroll and determines the number of hands to be simulated during a gaming session. Operating in automatic mode, the simulation program runs the simulation of the selected number of hands in automatic mode at a selected speed (hands dealt per time period) from a range of speeds, displaying each hand on a display screen of the computer monitor at a speed selected in terms of number of hands dealt per time period. Again, statistics are collected during the simulation gaming session. Upon completion of the simulation, statistics summarizing the results of the simulation are selectively displayed to the viewer, including occurrences of winning and losing streaks of different lengths and maximum and minimum bankroll values.

In a third operating embodiment of the present invention, the session operating mode, the user selects a betting and playing strategy, a starting bankroll, a maximum session winning amount cut-off, a maximum session losing amount cut-off, a bail out percent, and the maximum number of hands to be played in total. The simulation proceeds on a gaming session by gaming session basis. A gaming session consists of a simulation of successive hands until the maximum session winning amount or maximum session losing amount is achieved, or, if the user is on a winning streak, the session will continue until the current session bankroll declines by an amount greater than the maximum session bankroll amount multiplied by the bail out percentage. The current session bankroll is then carried over to the next gaming session. Upon completion of the total number of hands specified (or a current bankroll value of zero, whichever comes first), the simulation is completed and statistics are displayed for each session of the simulation.

These and other objects, features and advantages of the invention will become better understood from the detailed description of the preferred embodiments of the invention which are described in conjunction with the accompanying drawings.

BRIEF DESCRIPTION OF THE DRAWINGS

The present invention is further described with reference to the accompanying drawings in which.

DETAILED DESCRIPTION OF THE INVENTION

Figure 1:
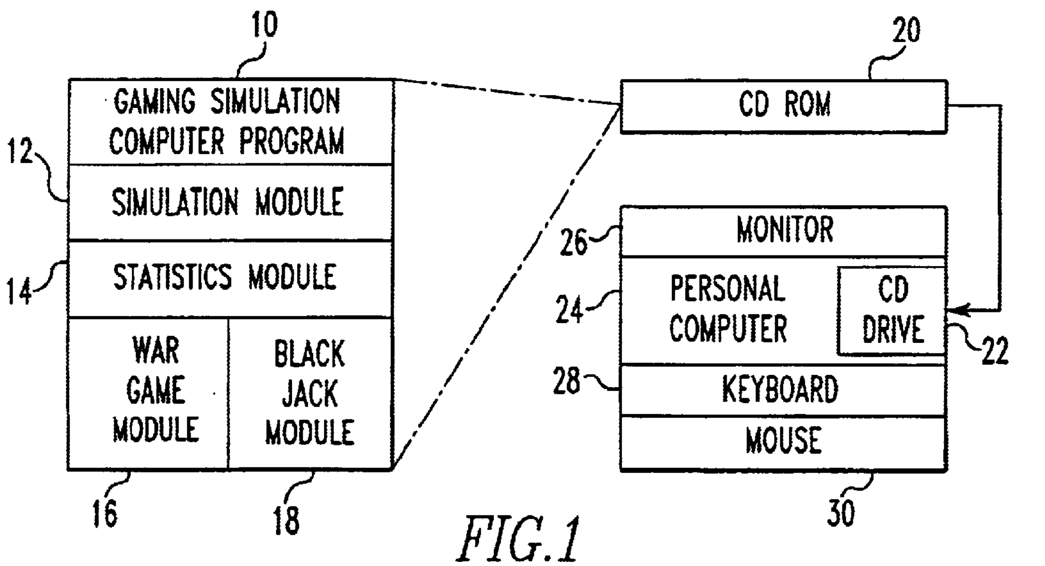
FIG. 1 is a conceptual diagram showing modules of the gaming simulation module.

Referring to the drawings, the gaming simulation computer program of the present invention is shown conceptually at 10 in FIG. 1. The program 10 consists of a simulation module 12, a statistics module 14, and gaming modules including a war game module 16 and a blackjack module 18. One skilled in the art would recognize that other gaming modules such as craps, poker, keno, baccarat, etc. may be advantageously added to the program 10. It should be understood that the present invention is not limited to the two specific games of chance noted. The program 10 preferably is stored on a computer readable media such as a compact disk (CD ROM) 20, inserted in a CD device 22 in a personal computer (PC) 24 on which the program 10 is new. One skilled in the art, however, would recognize that the program 10 may be run on a dedicated electronic device, such as a hand held electronic game device, instead of the PC 24. The PC has a monitor 26 along with a keyboard 28 and a mouse 30.

Figure 2:
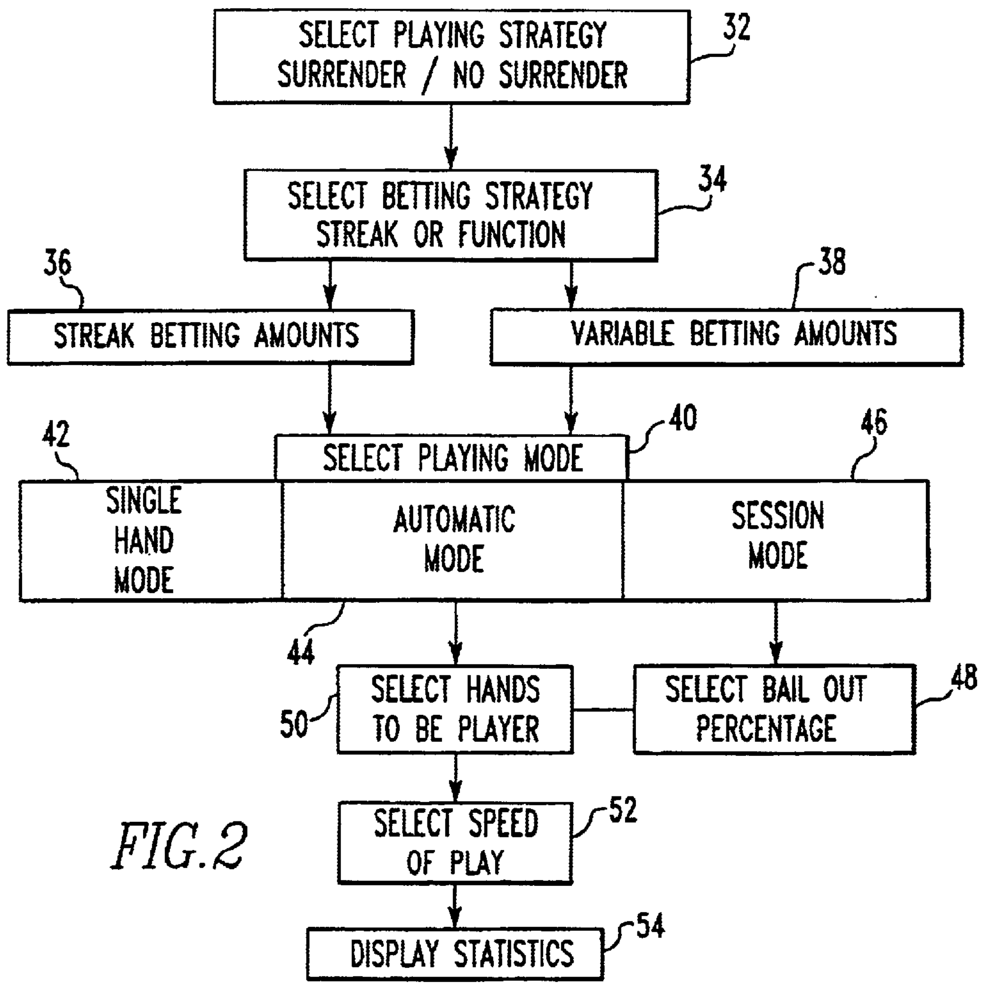
FIG. 2 is a user interface block diagram of the war game of the gaming simulation program.

The program 10 includes a war game module 12. A block diagram of the war game simulation module 16 is shown in FIG. 2. The module 16 and 18 are programed in the C++ programming language and are suitable to run in a WINDOWS 98 environment. Of course, those skilled in the art will recognize that there are other suitable programming languages that could be used to program the simulation concepts of the present invention.

Referring to FIG. 2, in step 32 of the game, the user selects a playing strategy. The user then selects a betting strategy in step 34, either streak or function. In step 36, streak betting amounts are selected. Alternatively, in step 38 variable betting amounts are selected. With either betting strategy in step 40 there is a selection of playing mode. Such playing mode may be a single hand mode as in step 42, an automatic mode as in step 44, or a session mode as in step 46. If the session mode is selected, a bail out percentage is selected in step 48. With either the automatic mode in step 44 or the session mode in step 46, there is a selection of hands to be played in step 50. There is also a selection of speed play in step 52 then a display of statistics in step 54.

In the game of war, the playing strategy involves the selection of a surrender strategy or a no surrender strategy which is employed in the event that in a particular hand the numeric value of the card dealt to the "dealer" matches the numeric value of the card dealt to the user or "player". A number card has a numeric value equal to the card number, e.g., a three of hearts has a numeric value of three. A face card, jacks, queens, kings and aces have the following numeric values, a jack has a numeric value of 11, a queen has a numeric value of 12, a king has a numeric value of 13, and an ace has a numeric value of 14.

A war would occur in a hand where the dealer and the player are dealt cards with identical numeric values. The surrender strategy, if selected by the player, means that when a war occurs, the player opts to complete the war hand by surrendering one half of his or her current bet to the dealer. The next hand is then dealt as if the war hand did not occur, that is, the war hand does not count as a win or a loss for purposes of computing the player's winning or losing streak length. The no surrender strategy, if selected, means that when a war occurs, tiebreaker or war breaker hand is dealt to decide the winner of the war hand, the player increases the "pot" by putting up an additional amount of money to match the current bet (in effect, doubling the current bet of the war hand). The winner of the tiebreaker hand takes the entire pot, that is, three times the player's current bet on the war hand. The total pot is determined as follows: total pot=the player's current bet for the war hand+the dealer's current bet for the war hand (which matches the player's current bet for the war hand)+the player's tiebreaker hand bet (which matches the player's current bet for the war hand). In the event that the tiebreaker hand results in another war, the same process is repeated. The outcome of the tiebreaker hand is counted as a win or a loss, as appropriate, in determining the player's winning or losing streak length.

In one preferred embodiment of the present invention, the player selects between a fixed betting strategy and a variable betting strategy. At a input block, the player inputs the winning and losing sequence length or number of hands that he or she wishes to enter bet amounts for.

Betting strategy involves selecting winning sequence lengths (WS) and associated bet amounts for winning streaks of length 1 through WS, selected losing sequence length and associated bet amounts for losing streaks for bet amounts.

Playing options include selecting the number of decks in shoe (list options). The cards dealt for each hand are selected via a random number generator subroutine in the program. The cards for the "dealer" and the user for each hand are concurrently displayed in a playing area. In the automatic and session modes, maximum speed of playing is a hand being dealt every 0.1 seconds. The statistics routine displays the results of the hands played.

Figure 3:
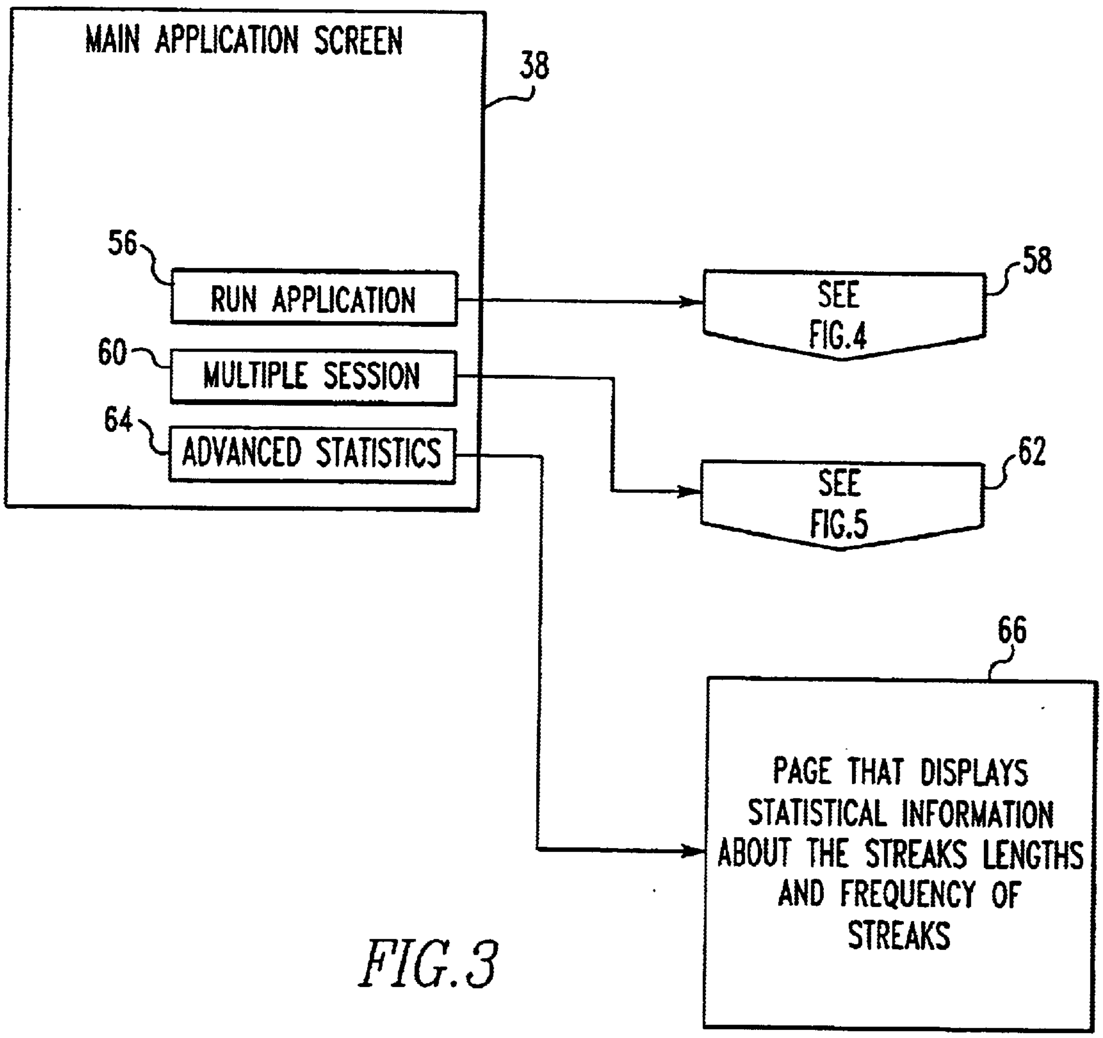
FIG. 3 is a block diagram showing the use of the application main screen for selecting play in the war game gaming simulation program shown in FIG. 2.
Figure 4:
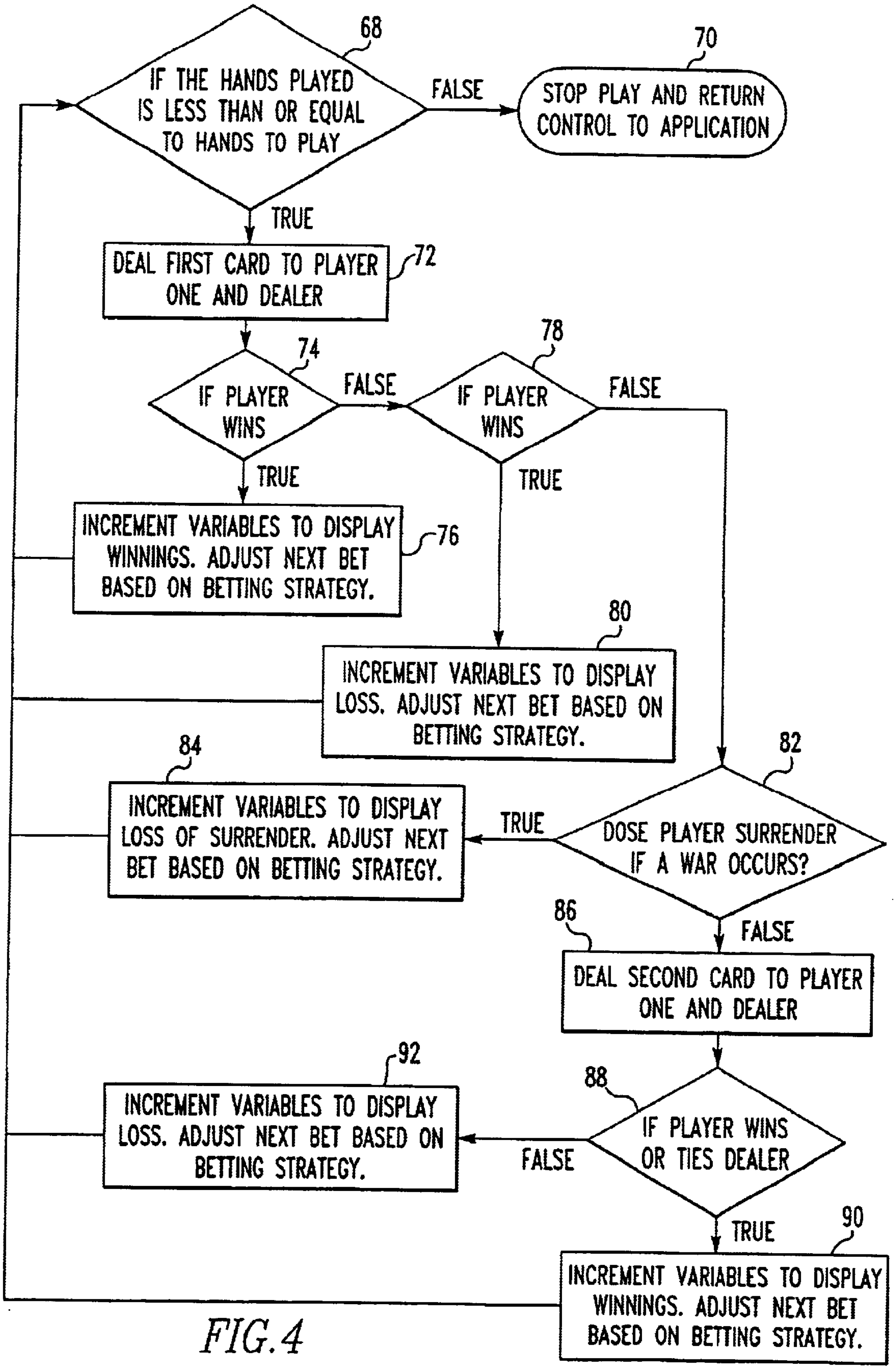
FIG. 4 is a block diagram of the application play logic for the war game of the gaming simulation program shown in FIG. 2.
Figure 5:
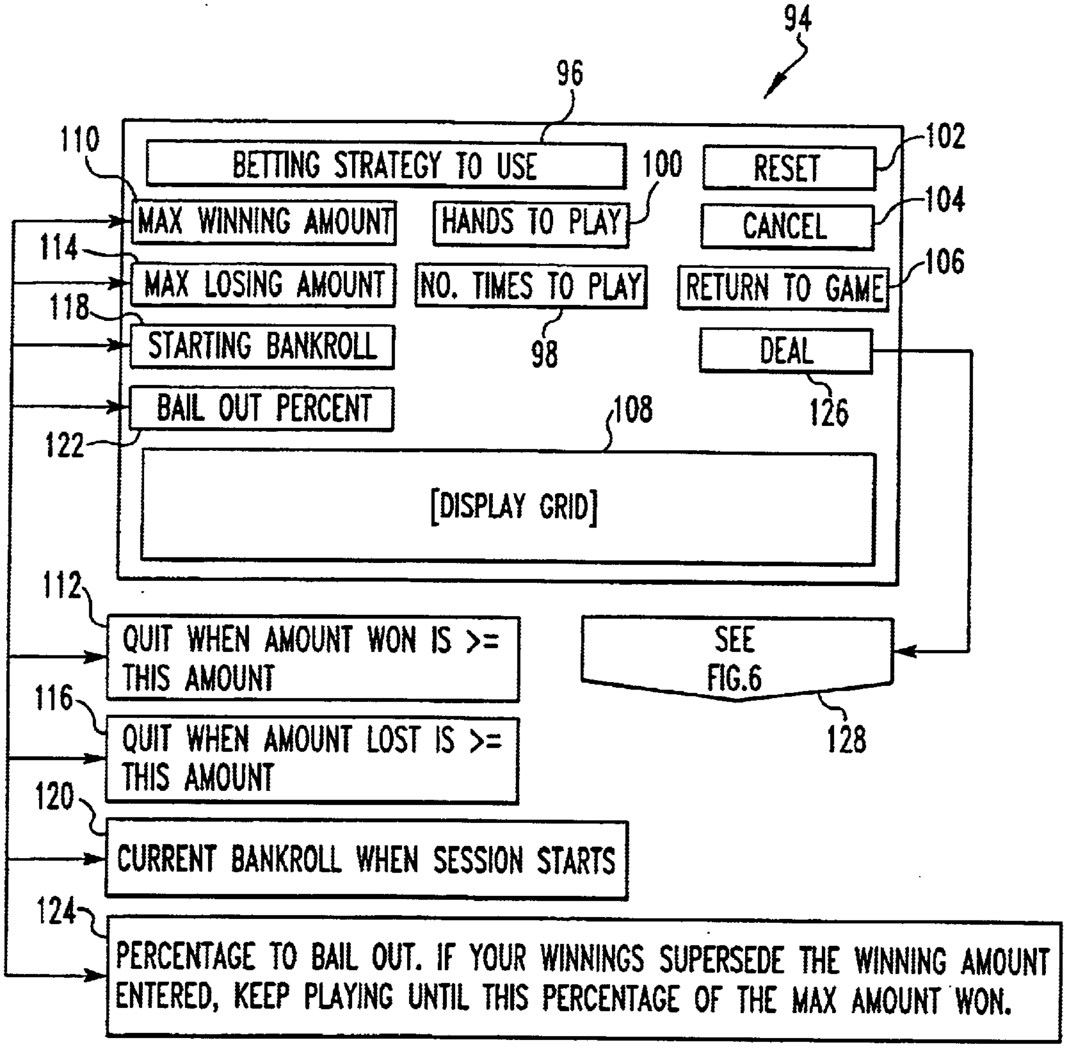
FIG. 5 is a block diagram showing use of the multiple session screen for the gaming simulation program shown in FIG. 2.

Referring to FIG. 3, a single run application 56 initiates the application play logic 58 that is shown in FIG. 4. Multiple session 60 initiates the multiple session screen 62 as is shown in FIG. 5. Advanced statistics 64 initiates a page that displays statistical information concerning streak length and frequency of streaks 66 as is illustrated, for example, in FIG. 5.

Referring to FIG. 4, the application play logic begins by determining at step 68 if the hand played is less than or equal to the number of hands to play. If it is not at step 70, play stops and control is returned to the application. If it is, at step 72 the first card is dealt to the first player and dealer. The determination at step 74 is then made if the player wins. If the player does not win, the dealer wins at step 78 which at step 80 there is a increment value displayed loss. If the dealer does not win at step 78, a determination at step 82 is made as to whether the player surrenders if a war occurs. If the player surrenders at step 84, increment variables display loss of surrender and the next bet is adjusted based on betting strategy. If the player does not surrender at step 86, a second card is dealt to player one and the dealer. If the player wins or ties dealer at step 88, increment variables display winnings at step 90 and the next bet is adjusted based on betting strategy. If the player does not win or tie the dealer, increment values are displaying loss at step 92 and the next bet is adjusted based on betting strategy.

Figure 6:
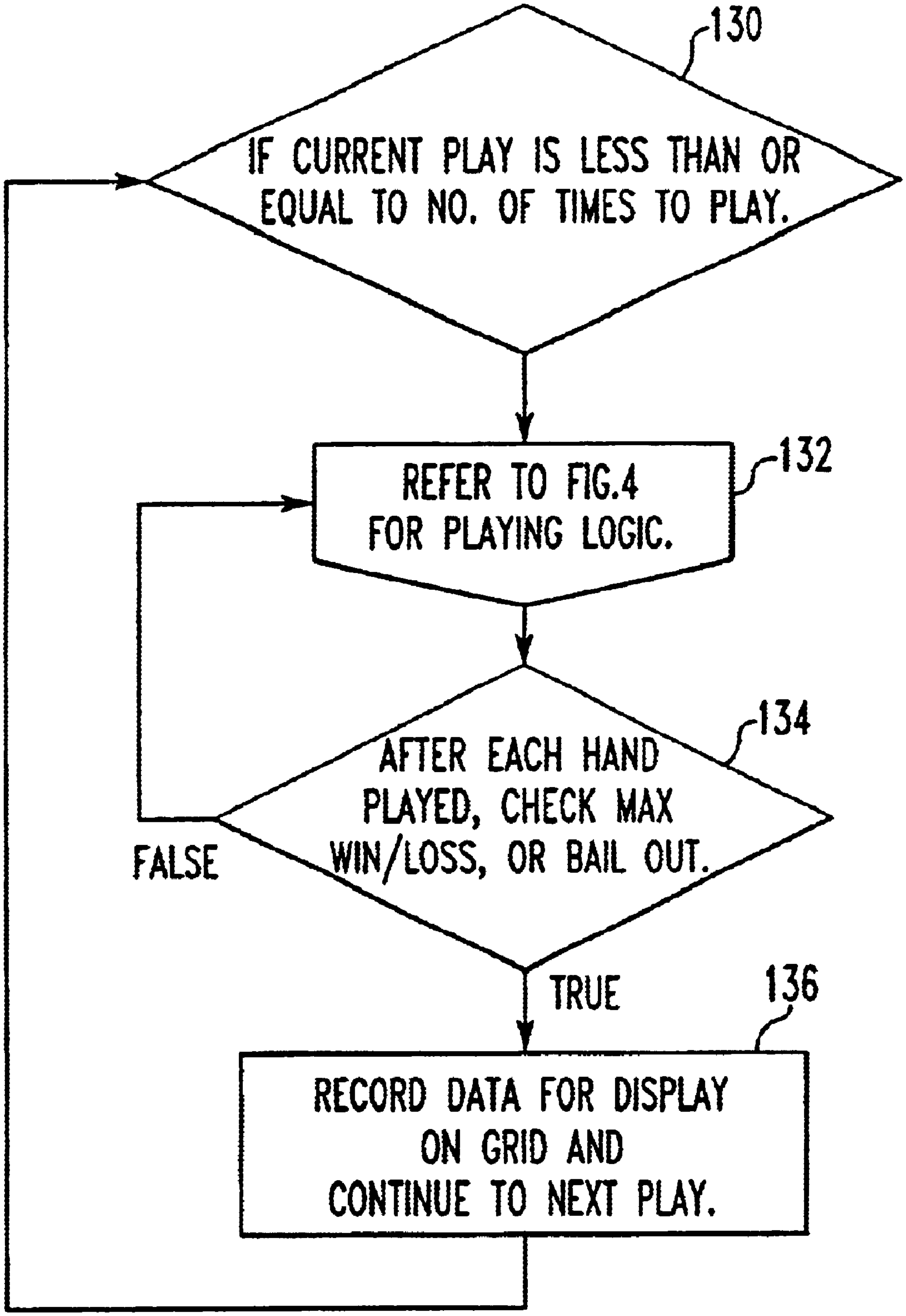
FIG. 6 is a block diagram of the multiple session play logic for the gaming simulation program shown in FIG. 2.
Figure 7:
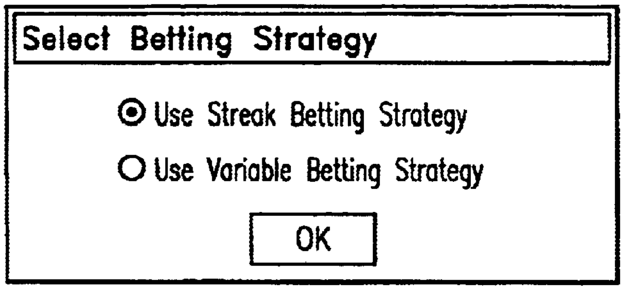
FIG. 7 is a representation of a first screen display of a war game of the gaming simulation computer program of the present invention in which betting strategy is selected.

Referring to FIG. 5, the multiple session screen is shown generally at numeral 94. This screen 94 has inputs for betting strategy to use 96, number of times to play 98, reset 102, cancel 104, and return to game 106. There is also a display grid 108. There is also a maximum winning amount entry 110 which at step 112 causes the session to quit when the amount won is greater than or equal to this amount. There is a maximum losing amount entry 114 which at step 116 causes the session to quit when the amount lost is greater than or equal to this amount. There is a starting bankroll 118 which enters a current bankroll when the session starts at step 120. There is a bailout percent entry 122 which enters the percentage for bailout at step 124. That is, if the winnings supersede the winning amount entered, play will continue until the player has lost this percentage of the maximum amount won. For example, if the maximum winnings are $400.00 and the bailout is 10% and current winnings are $600.00, there will be a stop play when the player loses $60.00 or 10% of maximum winnings. The deal input 126, at step 128 refers to FIG. 6 which results in a determination at step 130 if current play is less than or equal to the number of times to play. Then, referring to FIG. 6, playing logic is initiated at step 132. At step 134 after each hand is played, there is a check of maximum and minimum loss or bailout. If the amount has reached such maximum or minimum or bailout amounts, then at step 136 data is recorded for display on the grid 108 and continues to the next play at step 130 where it is again determined if current play is less than or equal to the number of times to play. If at step 134 it is determined that the amount won or lost of the percentage of loss is not outside the maximum or minimum amount or bailout amount, then play logic again begins at step 132.

Figure 8:
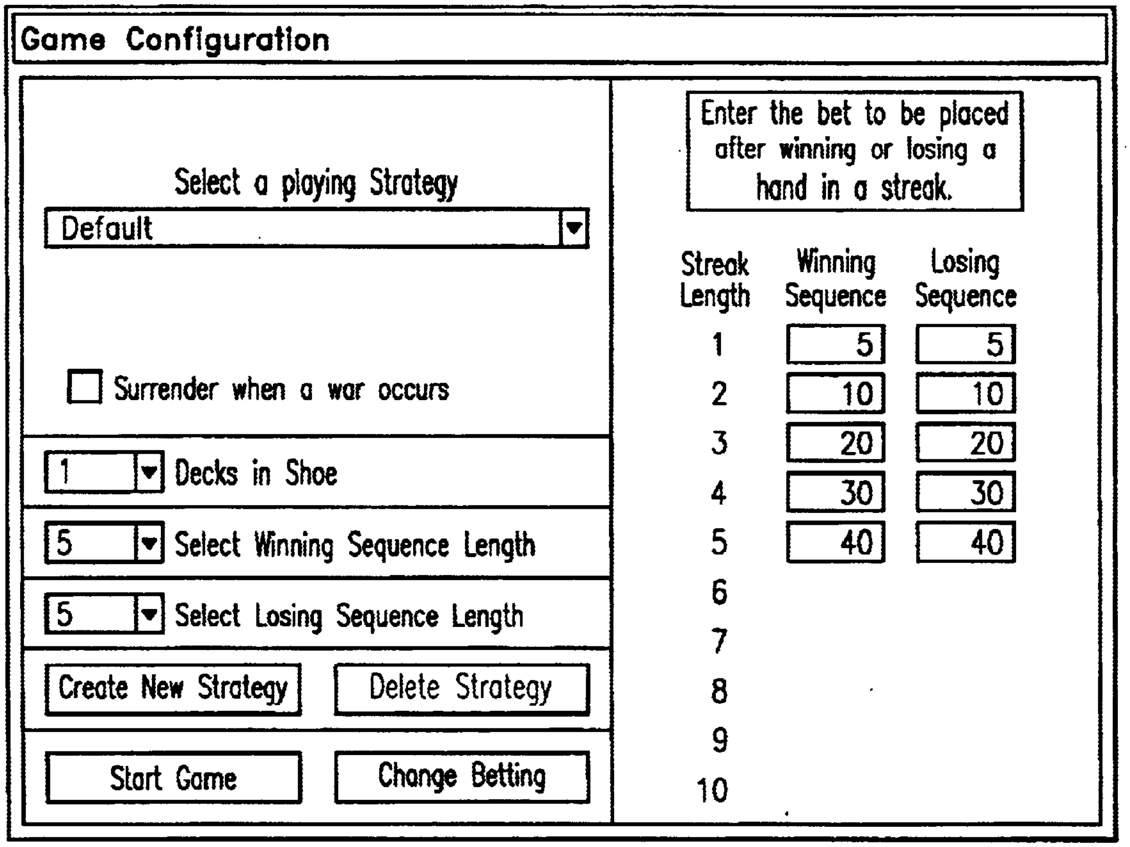
FIG. 8 is a representation of a second screen display of the war game of the gaming simulation program which is the game configuration screen for streak betting.
Figure 9:
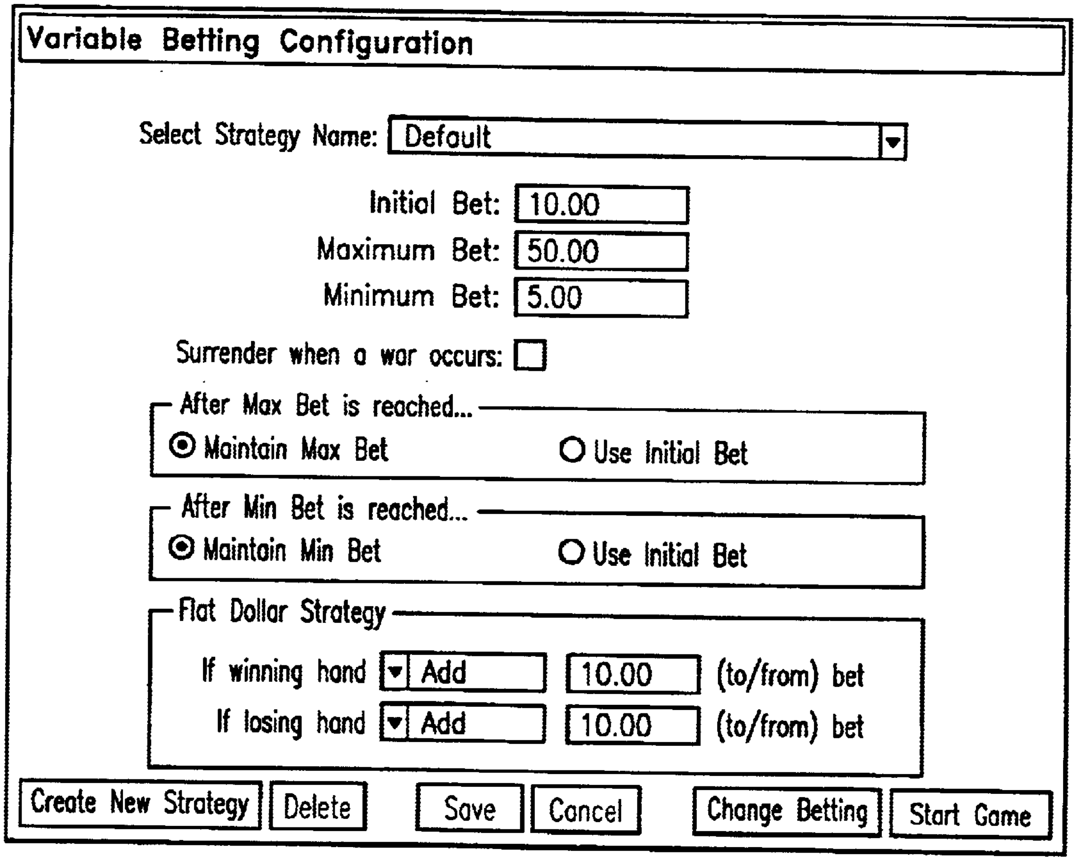
FIG. 9 is a representation of an alternate second screen display of the war game of the gaming simulation program which is the game configuration for variable betting.
Figure 10:
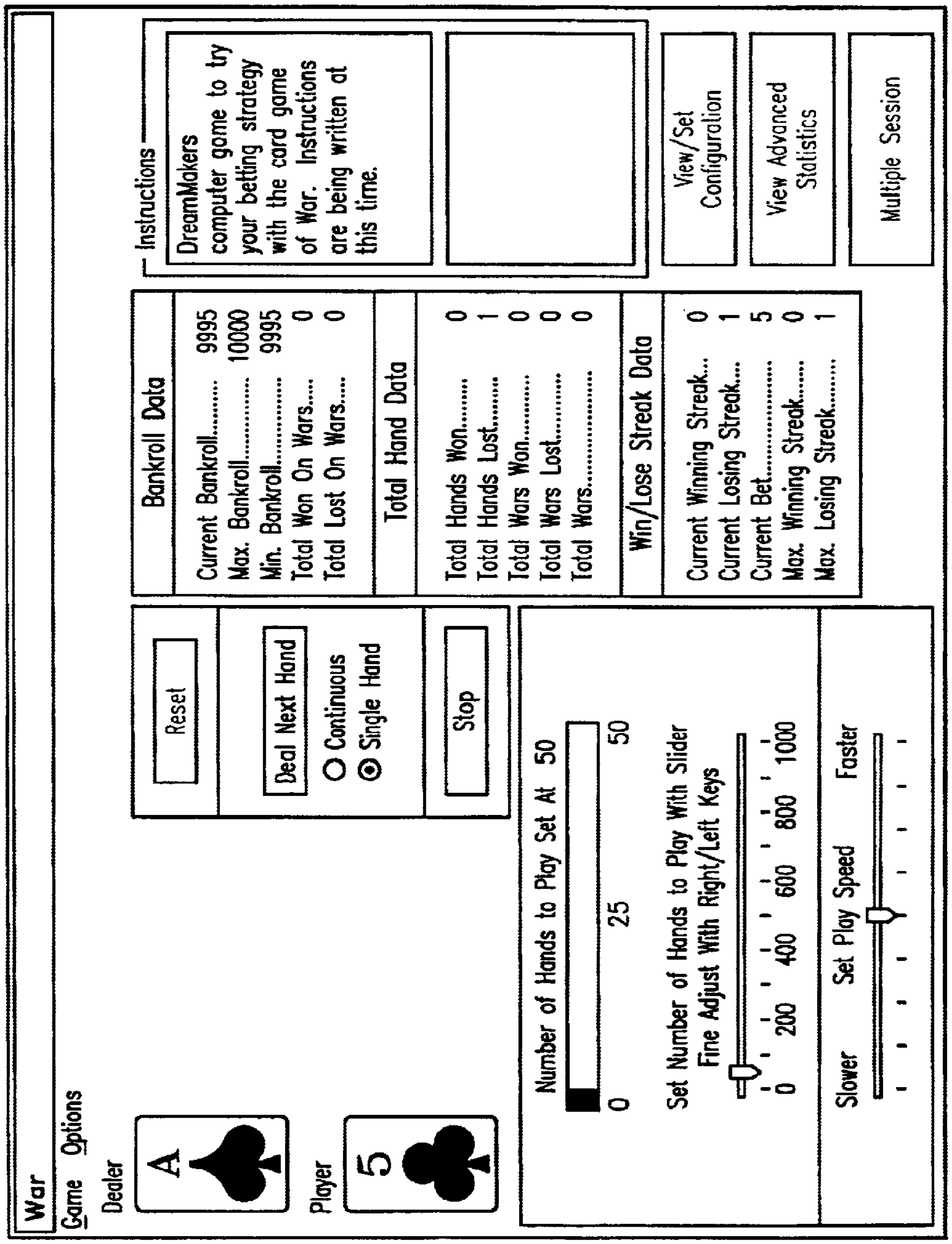
FIG. 10 is a representation of a third screen display of the war game of the gaming simulation program which is the play screen for the selected configuration.
Figure 11:
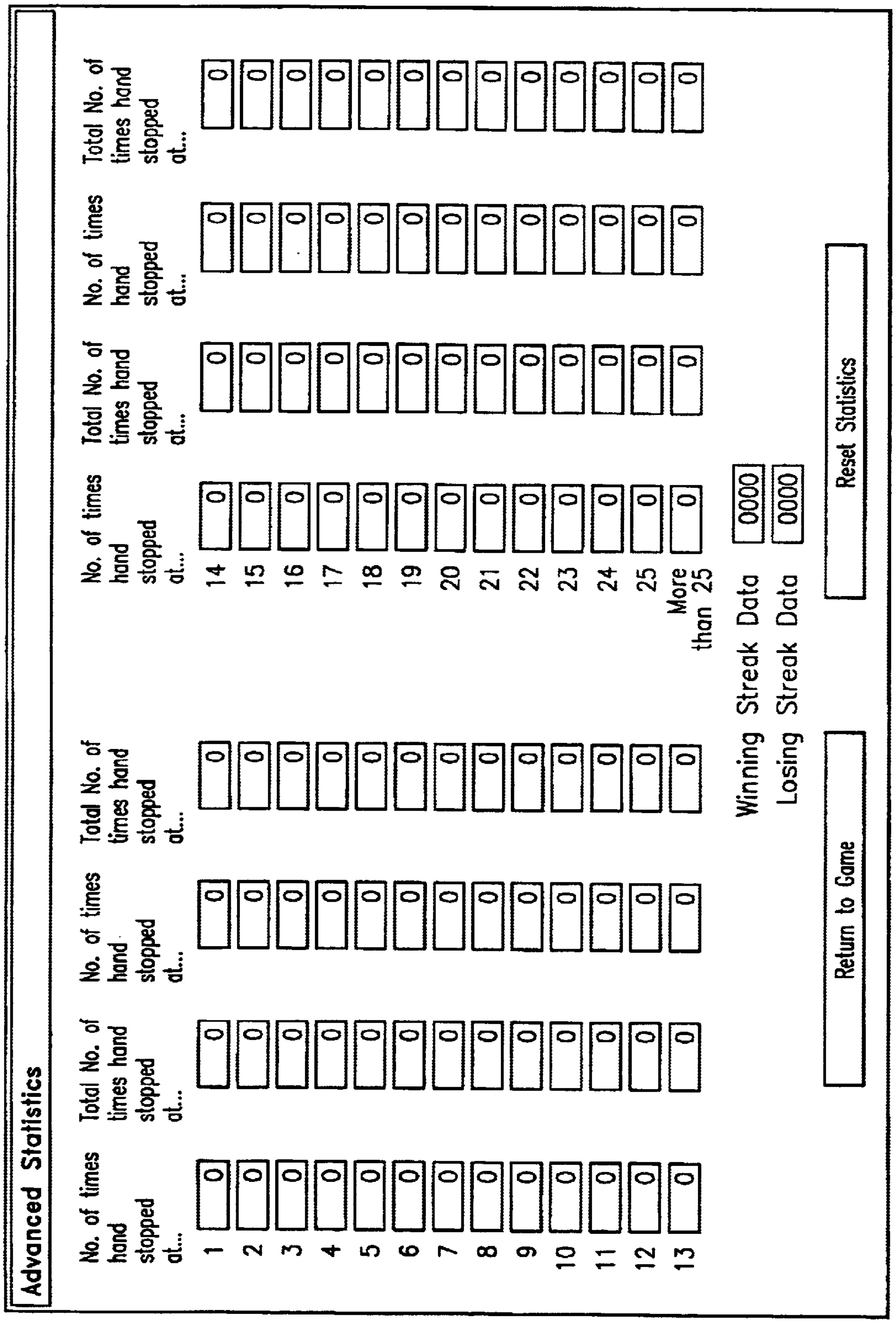
FIG. 11 is a fourth screen display of a war game of the gaming simulation program which is an advance statistics summary of a game.

FIGS. 7–13 are representative illustrations of the displays or screen shots that would be seen on a display or monitor by the user playing the war game module 12. FIG. 8 shows an initial screen entitled "Game Configuration" displayed to the user or player when the war game module is selected. Not shown is an initial menu screen in which the user selects the desired game by double clicking on an icon representative of the war game module which is displayed on the monitor. The initial screen called the Game Configuration Screen includes prompts for input of the playing strategy, the betting strategy and card deck options to be made by the user.

Figure 12:
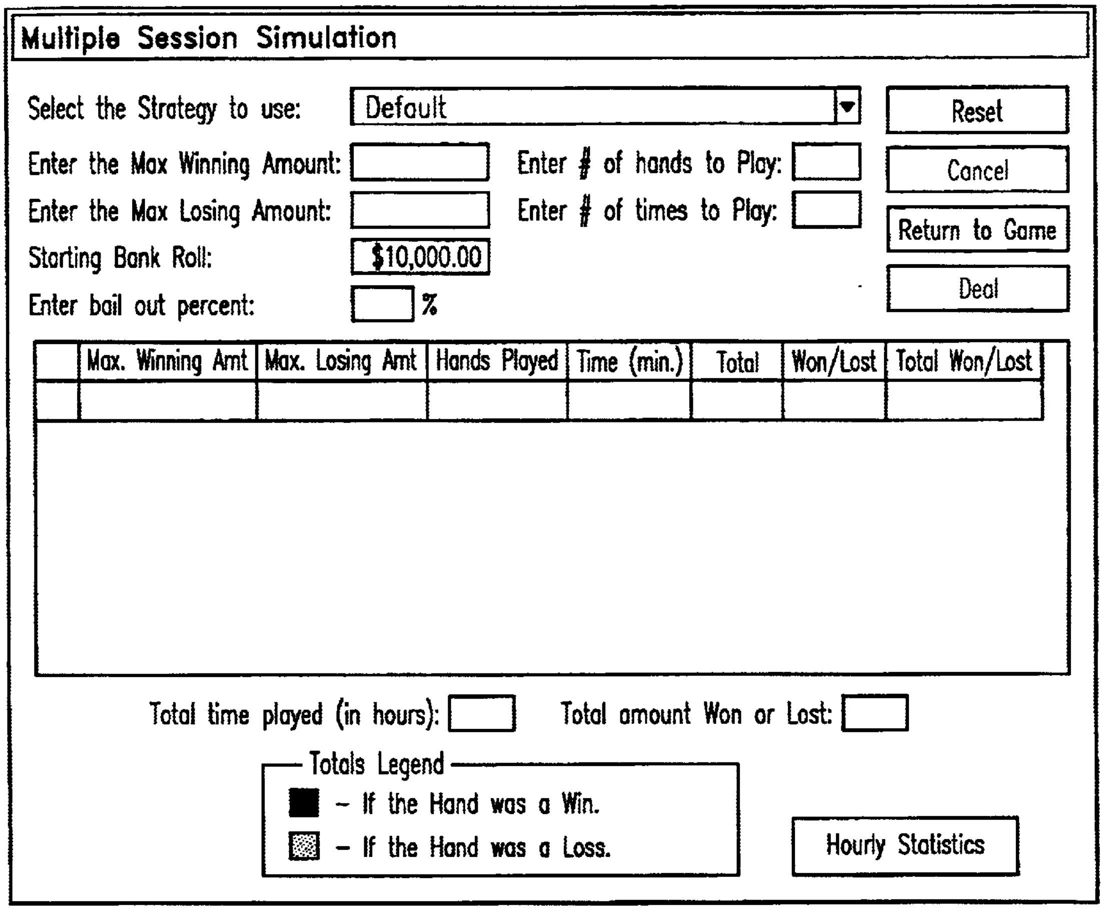
FIG. 12 is a fifth screen display of a war game of the gaming simulation program which is the screen employed in the multiple session simulation mode.
Figure 13:
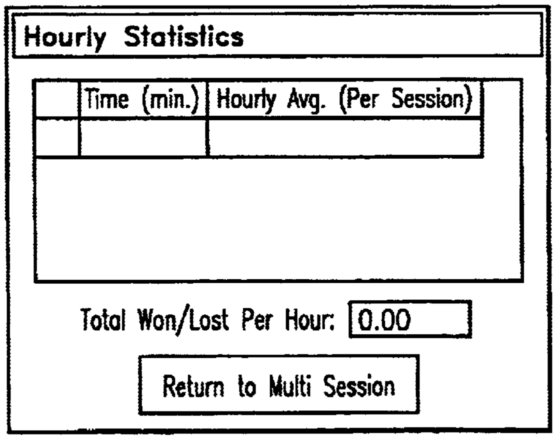
FIG. 13 is a sixth screen display of a war game of the gaming strategy which is an hourly statistics summary of a game.

In the first screen shown, the player would select either a streak betting strategy or a variable betting strategy. On the great game configuration screen, the player will select both a playing strategy and a betting strategy. In the game of war, the playing strategy comprises of selection of either to surrender when a war occurs or to not surrender when a war occurs. A streak betting strategy may also be selected in which the player may select the length of a winning sequence and the length of a losing sequence. Depending on the length of the streak, a specific amount for a bet may also be selected. For example, if the winning streak has a length of 1, a bet of 5 may be selected. If the winning streak has a bet of 2, a bet of 10 may be selected. In the same way, winning streaks of 3, 4, and 5 may result in bets of 20, 30, and 40. Of course, different specific amounts for the bets may be selected for each of these winning streaks. Corresponding bets may be selected for the losing streak. It will be understood that the amount of bets for both winning and losing streaks may or may not be the same. In addition to a default playing strategy in which a decision is made only to as to whether to surrender or not surrender in event of war. A strategy may be followed in which an assumption is made that the dealer won't win four hands in a row. In another possible strategy, an assumption is made that the player will win the first two hands. The selection of either of these three strategies may result in variations in the number of decks in the shoe, the winning sequence, and the losing sequence. A preferred size of shoe in winning and losing sequence for each of a default strategy, and the other two strategies, is set forth in Table I. Preferred betting strategies are shown in Table II in which the amount to bet on the next hand for winning and losing streaks of various strengths when various assumptions are made. The abbreviation "W" herein means win or winning and the abbreviation "L" means losing. It will be understood, however, that within these strategies, the decks and the shoes and the winning and losing streaks may be adjusted. As an alternative to using the streak betting strategies as will be employed using the screen shown on FIG. 8, a variable betting strategy may be employed using the screen of FIG. 9. Using this screen, variable betting configuration can be employed. Like the streak betting configuration screen used on FIG. 8, with the variable betting configuration, a playing strategy can be selected regarding whether to surrender when a war occurs. Specific initial bets, maximum bets, and minimum bets may also selected and a decision may be made regarding whether to maintain the maximum bets after that point is reached or to return to the initial bet. Similarly, after the minium bet is reached, a decision may also be made as to whether to maintain the minimum bet or use the initial bet. A flat dollar strategy is employed wherein a specific amount may be added to or subtracted from the bet in the event of either a winning hand or a losing hand. After either a streak betting configuration or a variable betting configuration has been selected in the way described above, the game has begun using the screen shown in FIG. 10. On this screen, either a continuous deal or a single hand deal arrangement may be selected. The number of hands to be played as well as the speed of play may also be selected. On this screen, bankroll data, total hand data, and winning or losing streak data will also be displayed to the player. From the screen shown in FIG. 10, an advanced statistic screen shown in FIG. 11 may be viewed. On this screen, detailed winning streak and losing streak data is displayed so that the player will be able to ascertain the number of times and a total number of times winning streaks and losing streaks were stopped at particular numbers. From the game screen shown in FIG. 10, a multiple session simulation as shown in FIG. 12 may also be selected. From the multiple session simulation screen shown in FIG. 12, hourly statistics as shown in FIG. 13 may also be selected.

In the configuration for the blackjack game, a playing strategy may be selected in which the player selects whether to hit or stand on any combination of initial two cards based on the dealer's face card value. The player may also elect whether to split, double down, or take insurance in various situations. By the terms "hit" and "stand", what is meant is that a player elects respectively to accept a card or to not accept a card. In a "split" an existing initial hand is divided into two hands. When a player "double downs" it is meant that he doubles his bet. An "insurance" bet is one against the player's own hand in various situations. Depending on house rules, the player may double down on any hand or on a 10 and an 11 only. The player may also double down on splits. House rules may also be elected as to whether the dealer must stand on a soft 17 or be hit on a soft 17. by the term "soft" it is meant that an initial two card hand includes an ace. It may also be decided if in a contingency when a player has 21 and the dealer has an ace up to take insurance, take even money, or play out the hand. In the blackjack game, betting strategy may also be elected as to bankroll data, total hand data, and winning streak or losing streak data. The rules for the game of blackjack are well known and are described, for example, in *Hoyle's Rules of Games*, second edition (1983) by Albert H. Moorehead, et al. at pages 180–183.

Figure 14:
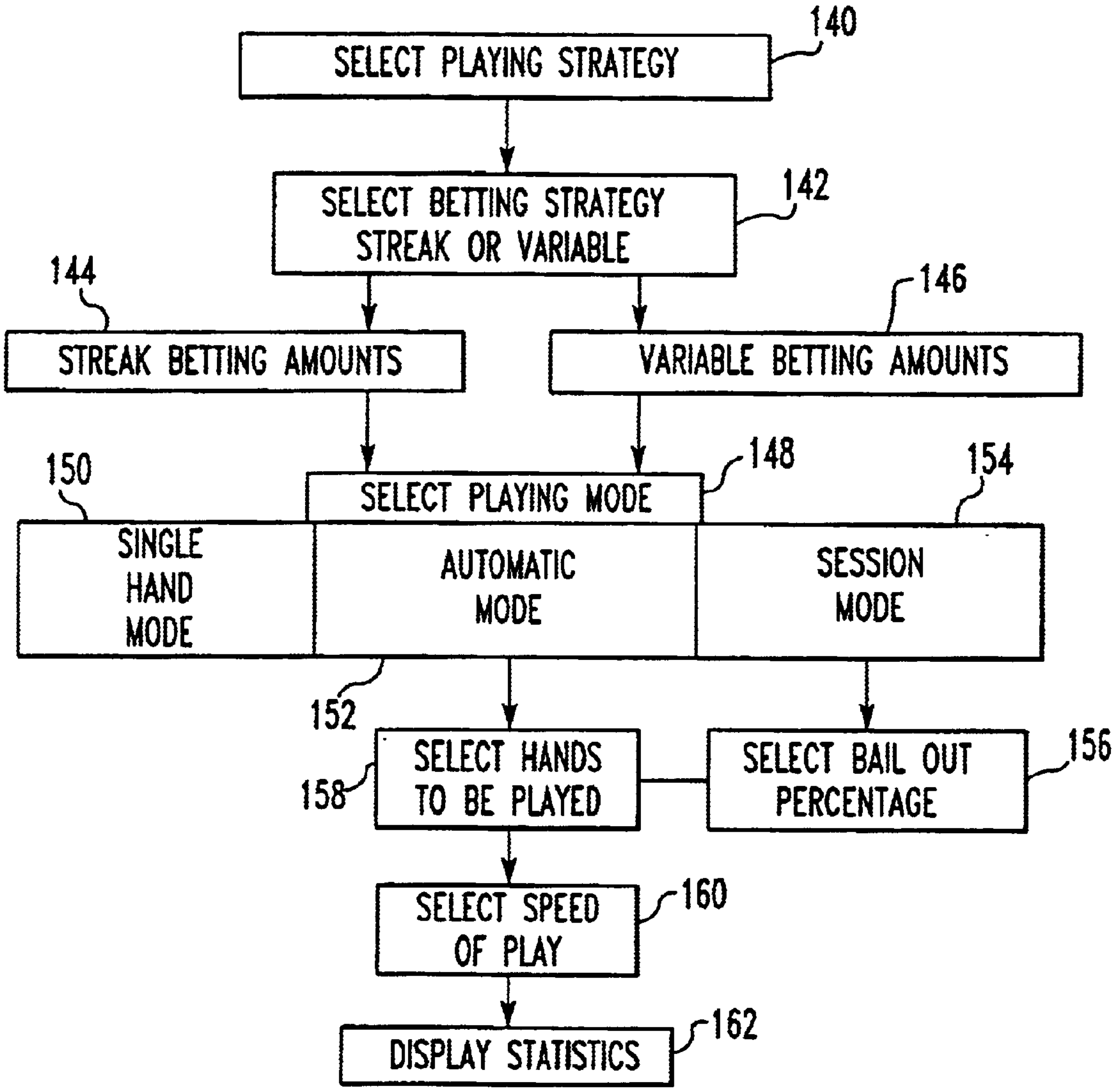
FIG. 14 is a user interface block diagram of a blackjack game of a preferred embodiment of the gaming simulation program of the present invention.

Referring to FIG. 14, the employment of the blackjack module 18 in FIG. 1 is described. In the employment of this module 18, a playing strategy is selected at step 140. A betting strategy is then selected at step 142. If a streak betting strategy is selected at step 144, streak betting amounts will be decided. If a variable betting strategy is selected at step 146, variable betting amounts will also be decided. A playing mode is then selected in step 148 wherein this playing mode will be either a single hand mode as in step 150, an automatic mode as in step 152 or session mode as in step 154. If a session mode is selected at step 156, a bailout percentage will be selected. If automatic mode or session mode is chosen, the number of hands to be played will be selected in step 158. In step 160, the speed of play will be selected and at step 162 statistics will be displayed.

Figure 15:
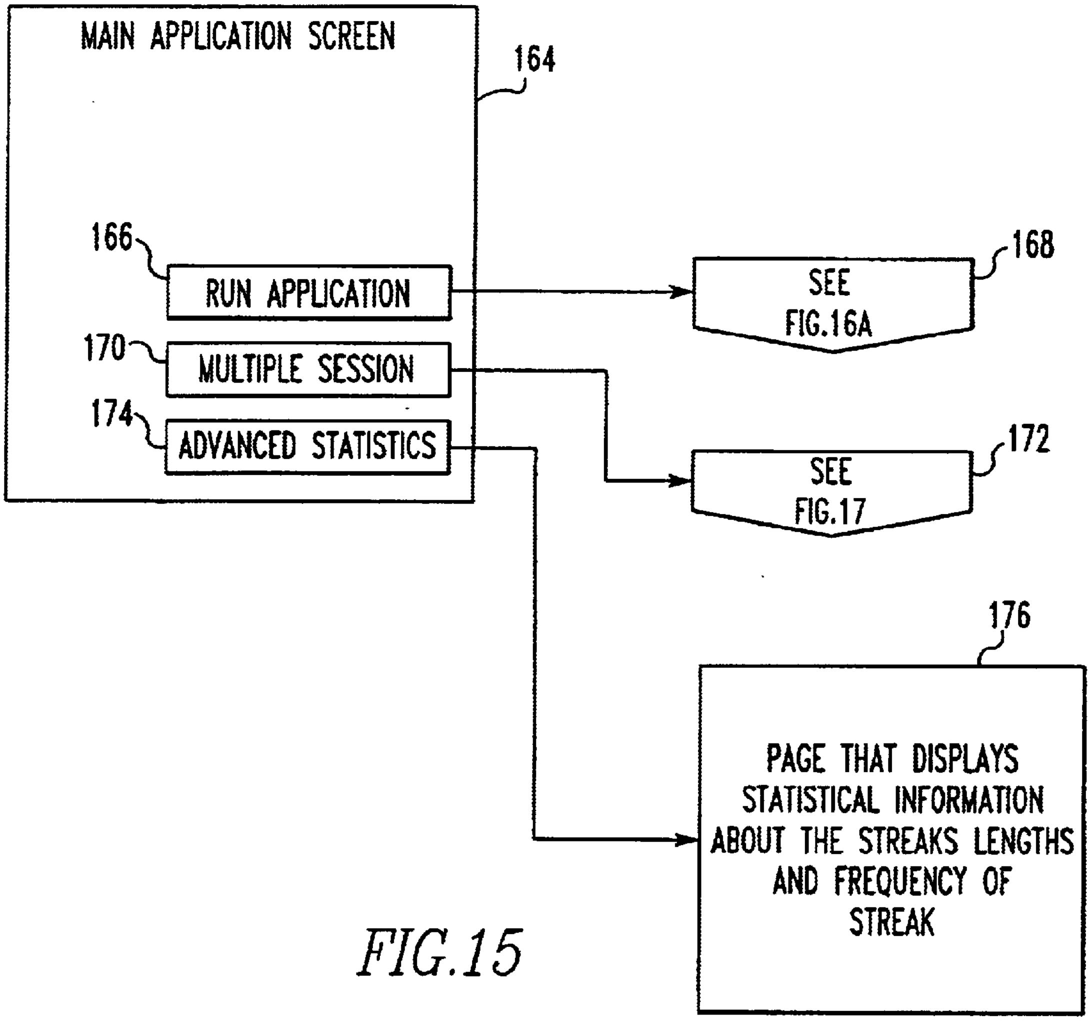
FIG. 15 is a block diagram showing the application main screen illustrating play selection in the gaming simulation program shown in FIG. 13.
Figure 16A:
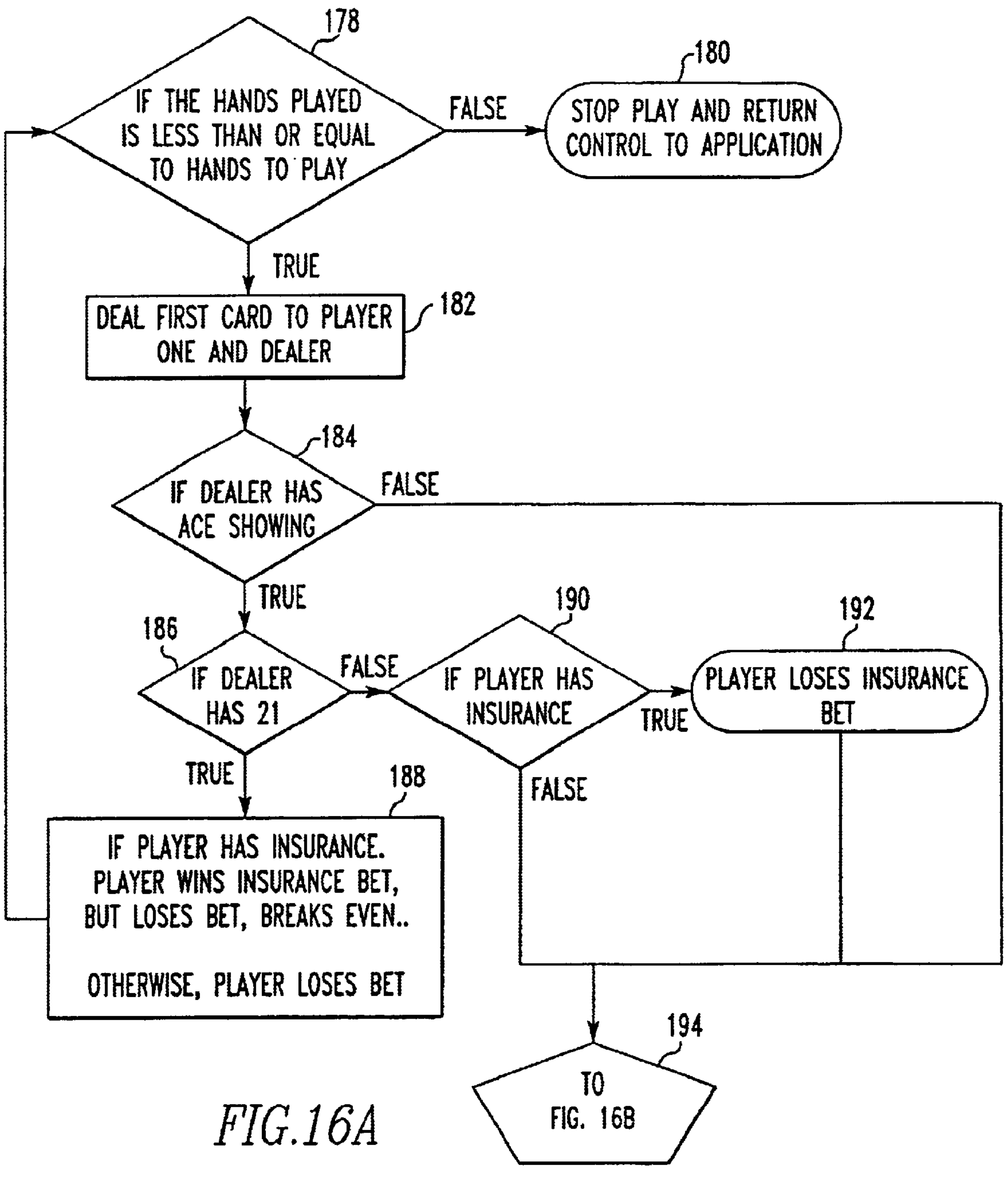
FIG. 16A is a block diagram illustrating application play logic for the gaming simulation program shown in FIG. 13.

Referring to FIG. 15, on the main application screen, input 166 may be used to run the application as at step 168 which is further detailed in FIG. 16A. There is also input 170 for selection of the multiple session mode at step 172 which is detailed in FIG. 16. There is also input 174 for selection of the advanced statistics which display page 176 for statistical information concerning the length and frequency of streaks.

Figure 16B:
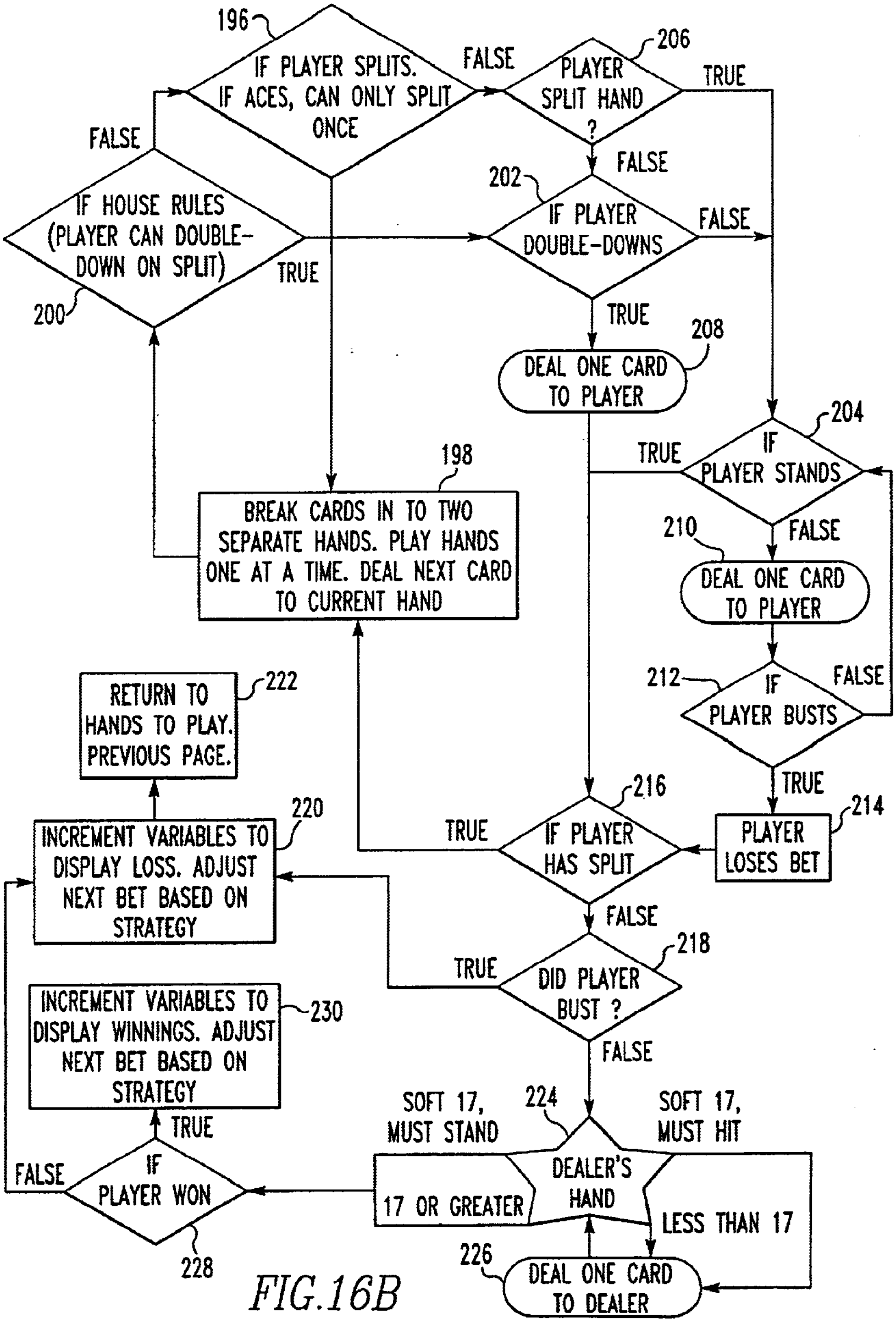
FIG. 16B is another block diagram showing application play logic for the gaming simulation program shown in FIG. 13.

Referring to FIGS. 16A, and 16B at step 178 it is first determined if the hands played is equal to or less than the hands to play. If it is not at step 180, play is stopped and control returned to the application. If hands played is equal to or less than hands to play, cards are dealt to the player and the dealer at step 182. At step 182, it is thus determined if dealer has an ace showing. If the dealer has an ace showing, it is determined at step 186 if the total of the dealer's cars are 21. If the dealer's total is 21, it is determined at step 188 if the player has insurance. If the player does have insurance, he wins the insurance bet, but loses the bet and breaks even. Otherwise, the player loses the bet. If the dealer does not have a total of 21 at step 190, it is determined if the player has insurance, and at step 192, if he does have insurance, the player loses the insurance bet. If the player does not have insurance, at step 194 the logic proceeds to 196 where a determination is made if a player splits in which case if he does at step 198 the cards are broken into two separate hands and one hand is played at a time wherein the next card is dealt to the current hand. A determination is then made if under house rules, a player can double down on his split at step 200. If he cannot, a determination is again made at step 196 if there is a split, and if so, if there are aces in which case only one split will be allowed. If house rules allow for double down on a split, a determination is made at step 202 if the player doubles down. If the player does not double down, a determination is made if the player stands at step 202. Returning to step 196, if there are no aces, a determination is made if the player further splits his hand at step 204. If he does not, a determination is made if the player doubles down at step 202 and if he does further split his hand, a determination is made at step 204 if the player stands. After the player does double down on a split hand, one card is dealt to the player at step 208. If the player does not stand at step 204, one card is dealt to the player at step 210 and step 212. A determination is made as to whether the player busts, and if he does not bust, a determination is again made at step 204 if the player stands. If the player busts, the player loses the bet at 214. By the term "bust", it is meant that the amount of the hand exceeds 21. If at step 216 the player had a split and if he does split, then he returns to step 198 to determine if cards will be broken into two separate hands and playing cards one hand at a time with a deal of a next card to the current hand. If at step 216 the player does not have a split, a determination is made at step 218 if the player busts. If the player does bust, reference is made to increment variables to display loss and the next bet is adjusted based on the strategy after which there is a return to step 178 on FIG. 16A to determine if the number of hands played is less than or equal to the number of hands to play. If at step 218 the player did not bust, reference is made at step 224 to the dealer's hand. If the dealer has a soft 17 or less than 17, he must, depending on house rules selected, hit and at step 226 one card is dealt to the dealer and reference again is made at step 224 to the dealer's hand. If the dealer has a soft 17 and under, depending on house rules, the dealer must stand or a 17 or greater. A determination is made at step 228 as to whether the player won, and if the player did win, reference is made at step 230 to increment values to display winnings and to adjust next bet based on strategy. If at step 228, the player did not win, reference is made at step 220 to increment values to display loss and to adjust the next bet based on strategy and then at step 222 to return to step 178 on FIG. 16A to determine if the number of hands played is less than or equal to the number of hands to play.

Figure 17:
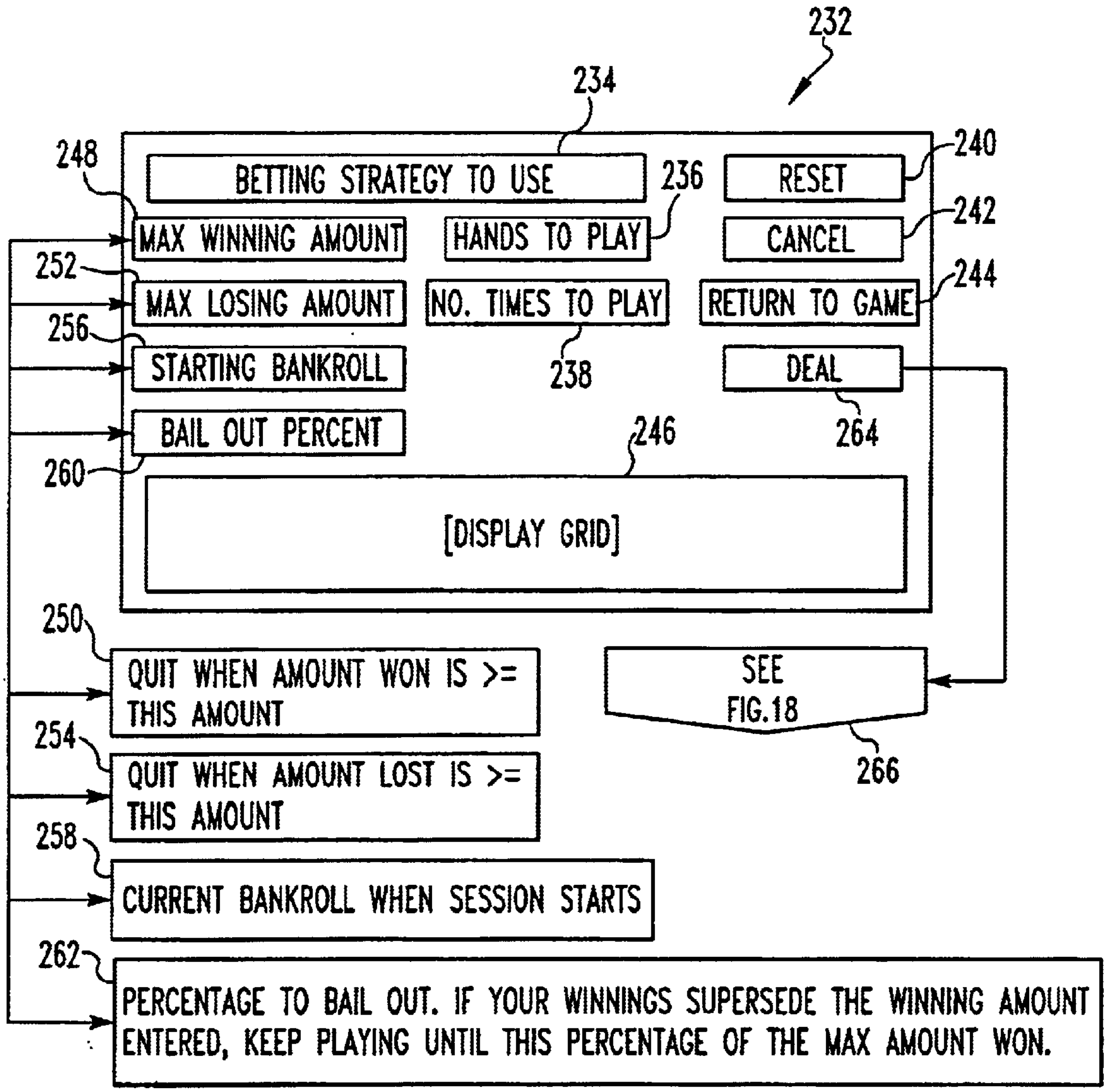
FIG. 17 is a block diagram showing use of the multiple session screen for the gaming simulation program shown in FIG. 13.
Figure 18:
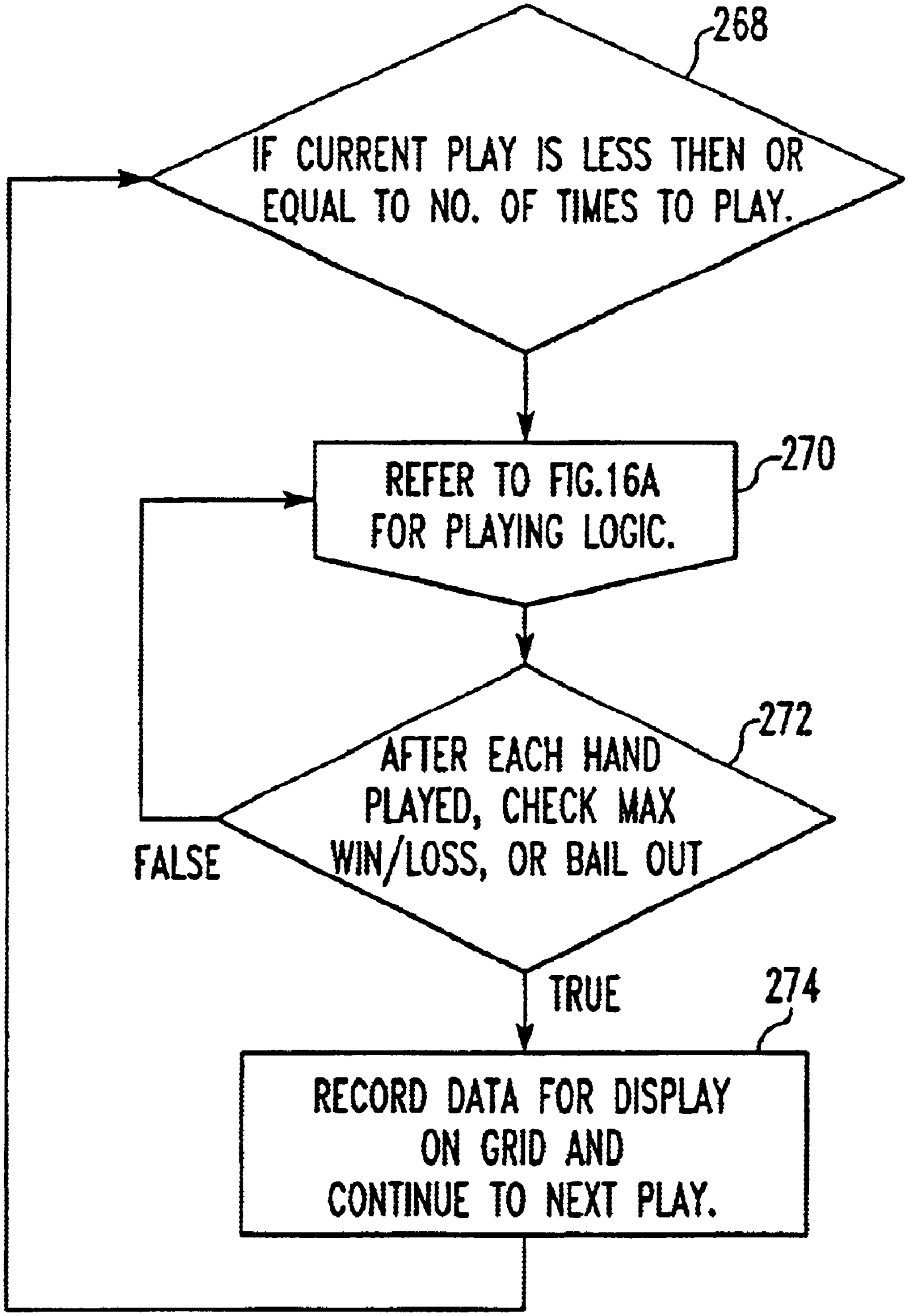
FIG. 18 is a block diagram of the multiple session play logic for the gaming simulation program shown in FIG. 13.

Referring to FIG. 17, the operation of a multiple session mode is described wherein the multiple session screen is shown generally in numeral 232. There is an input 234 for the betting strategy to use, and input 236 controls the number of hands to play and input 238 the number of times to play. There is an input 240 for reset, input 242 to cancel, and input 244 for a return to game. At input 248 the maximum winning amount may be entered so that when the amount won is equal to or greater than this amount, the game quits. At input 252 the maximum amount which is to be lost may be selected and entered so that at step 254 the game has quit when the amount lost is greater than or equal to this amount. At input 256 a starting bankroll is entered so that at step 258 a current bankroll at the time the procession starts is defined. Input 260 allows for the selection of a bailout percent to enable step 262 to be carried out by defining a percentage to bailout. That is, in step 262, if the player's winnings supersede the winning amount entered, play will continue until this percentage of a maximum amount is won. There is a deal input 264 which in step 266 begins the sequence on FIG. 18 in which in step 268 a determination is made if the current play is less than or equal to the number of times to play, and if it is, in step 270, playing logic begins on FIG. 16A. After each hand is played, there will be a check of maximum winnings or losses and bailout percentage in step 272. If such maximums have not been reached, step 270 will again be repeated in which playing logic will again be begun on FIG. 16A. If such maximums have been reached in step 272, data will be recorded for display on the grid and continued to the next play in step 272 after which step 268 will again be repeated and a determination will be made if current play is less than or equal to number of times to play. The multiple session screen will preferably be implemented for speed. The game will be played until any of the perimeters are matched, then it will continue to a new session until the number of times the play has been reached. A listing of the maximum winning amounts, maximum losing amounts, and hands played, time (in minutes), total for session, amount won or lost and total won or lost for all sessions will be made.

Figure 19:
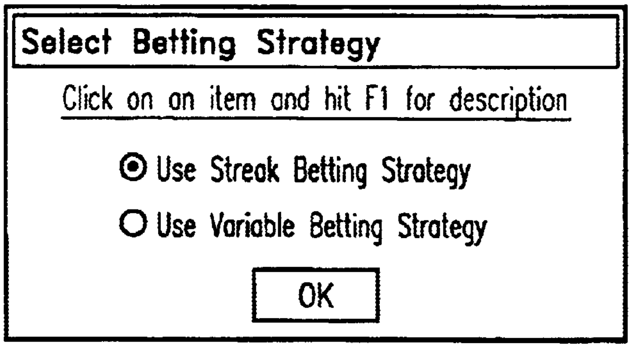
FIG. 19 is a representation of a first screen display of a blackjack game of the gaming simulation computer program of the present invention in which betting strategy is selected.
Figure 20:
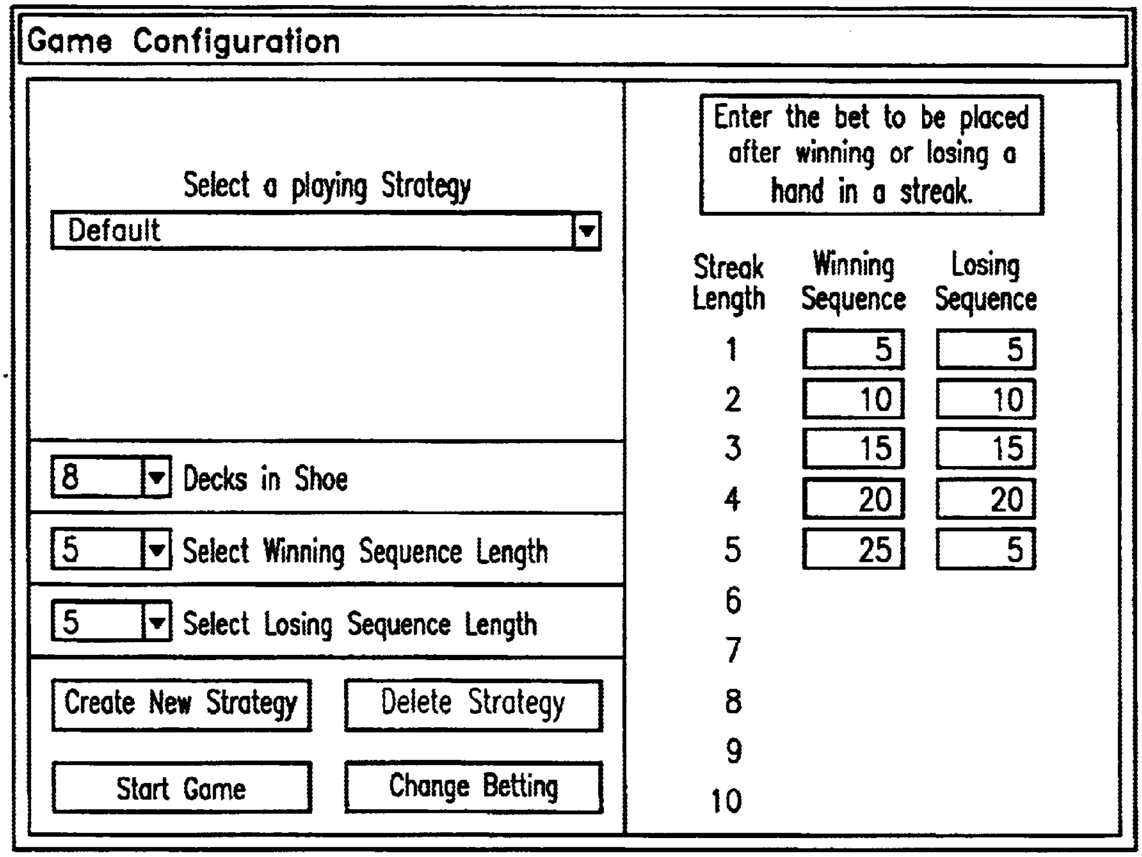
FIG. 20 is a representation of a second screen display of the blackjack game of the gaming simulation program which is the game in configuration screen for street betting.

Referring to FIGS. 19–26, the screens employed in the blackjack module are shown. In FIG. 19, a betting strategy is selected between a streak betting strategy and a variable betting strategy. If a streak betting strategy is selected, the game configuration screen shown in FIG. 20 is used. On this screen, a playing strategy can be selected from a default strategy in which no assumptions or predictions are made with regard to streaks or from a strategy based on an assumption that the dealer will not win four games in a row or from a strategy based on an assumption that the player will win the first two games. Still another strategy can be selected which is known as "5 & 5, 10, 20" in which it is assumed that losing streaks will not be of an extended length. In the "5 & 5, 10, 20" if the player wins, the next bet will be 10. If the player loses the game or this 10 bet, the next bet will be 20. Bets on any further successive losing games will be 20 until there is a winning hand in which case the bet on the next game will again be 5. In Table III, a preferred number of decks in the shoes, winning sequence length, and losing sequence length is shown for each of these strategies for playing the blackjack game. In Table IV, preferred bets for a winning or losing streak of various lengths is shown for each of these four strategies for playing the blackjack game. It will be understood that on the game configuration screen shown in FIG. 20 that the player may make adjustments in the number of decks in the shoe, winning sequence lengths, losing sequence lengths, and amounts of bets for various winning streaks for each of these strategies.

Figure 21:
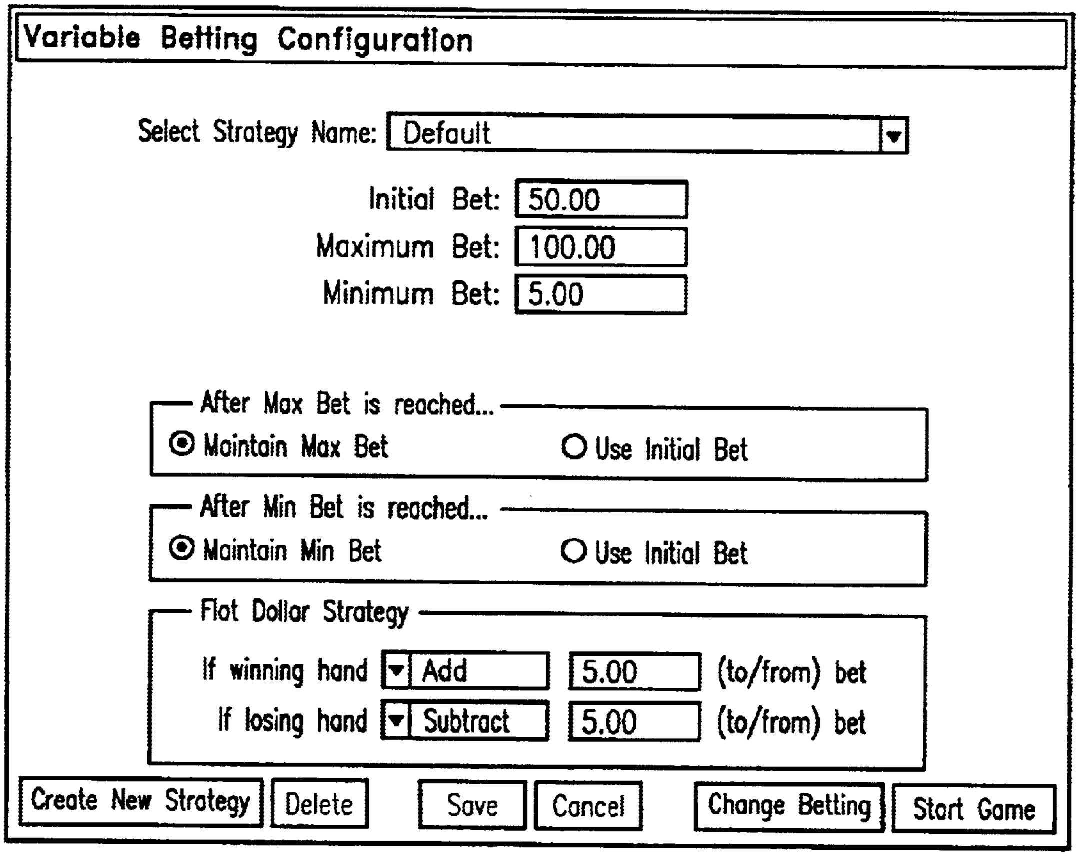
FIG. 21 is a representation of an alternative second screen display of the blackjack game of the gaming simulation program which is a game configuration for variable betting.

The variable betting configuration screen is shown in FIG. 21. On this screen, an initial bet, a maximum bet, and a minimum bet may be selected, and a betting strategy may also be employed in which the maximum bet is maintained after the maximum bet is reached or the initial bet is used. Similarly, after the minimum bet is reached, a strategy may be selected in which the minimum bet is maintained or the initial bet is again adopted. The betting strategy may also employ the option to add to a bet in the event of a winning hand or subtract from the bet in the event of a winning hand by a selectable amount. Similarly, if there is a losing hand, the player may also select an addition or a subtraction of a selected amount from the bet.

Figure 22:
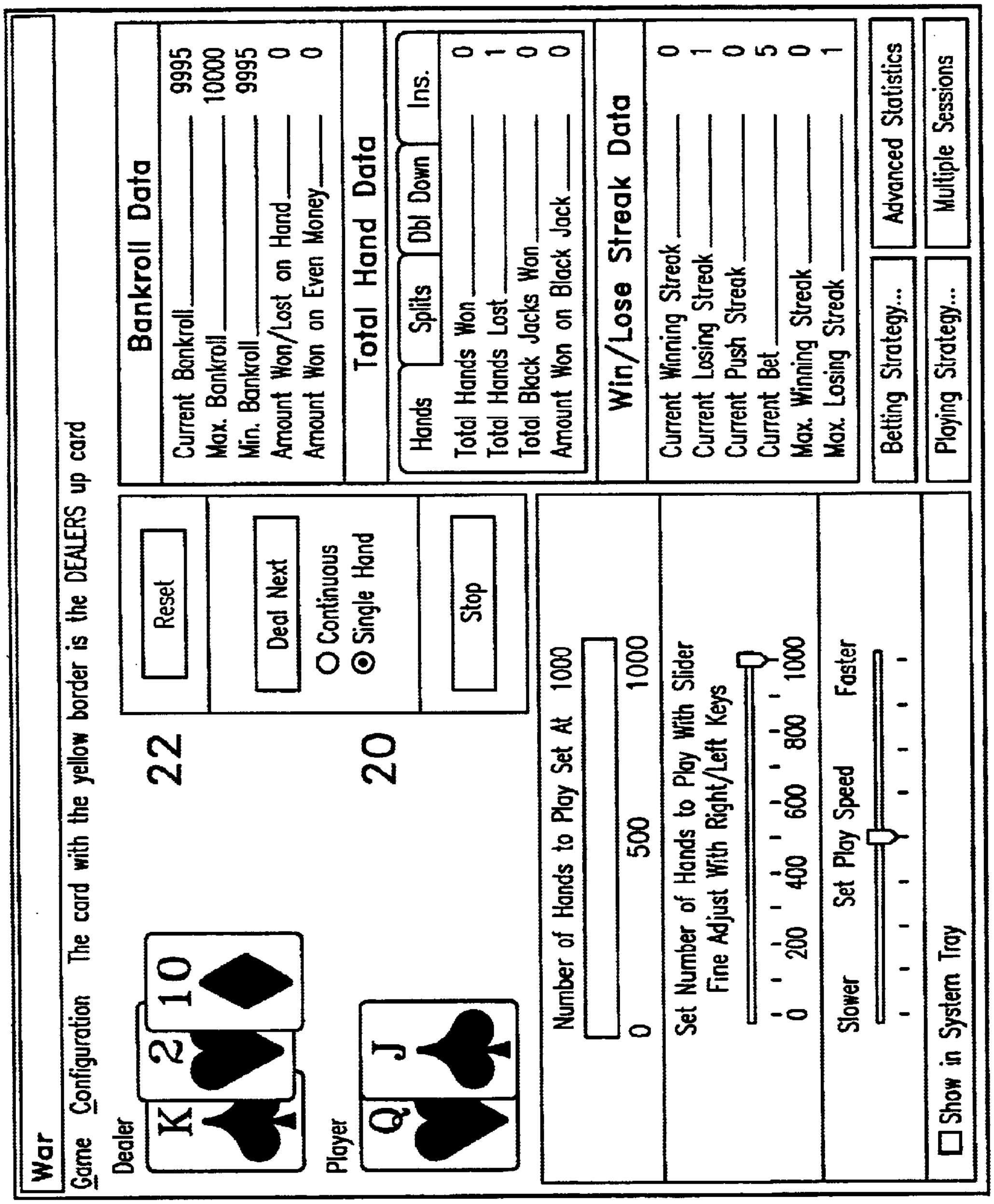
FIG. 22 is a third screen display of the blackjack game of the gaming simulation program which is the play screen for the selected configuration.

The game screen for the blackjack game is shown in FIG. 22. On this screen, the player can select a continuous or a single-hand deal. The player can also select a number of hands to be played and speed of play. Betting strategy and playing strategy may also be employed. As will be discussed hereafter, advanced statistics and multiple sessions may also be selected. Bankroll data, total hand data, and winning and losing streak data are also displayed.

Figure 23:
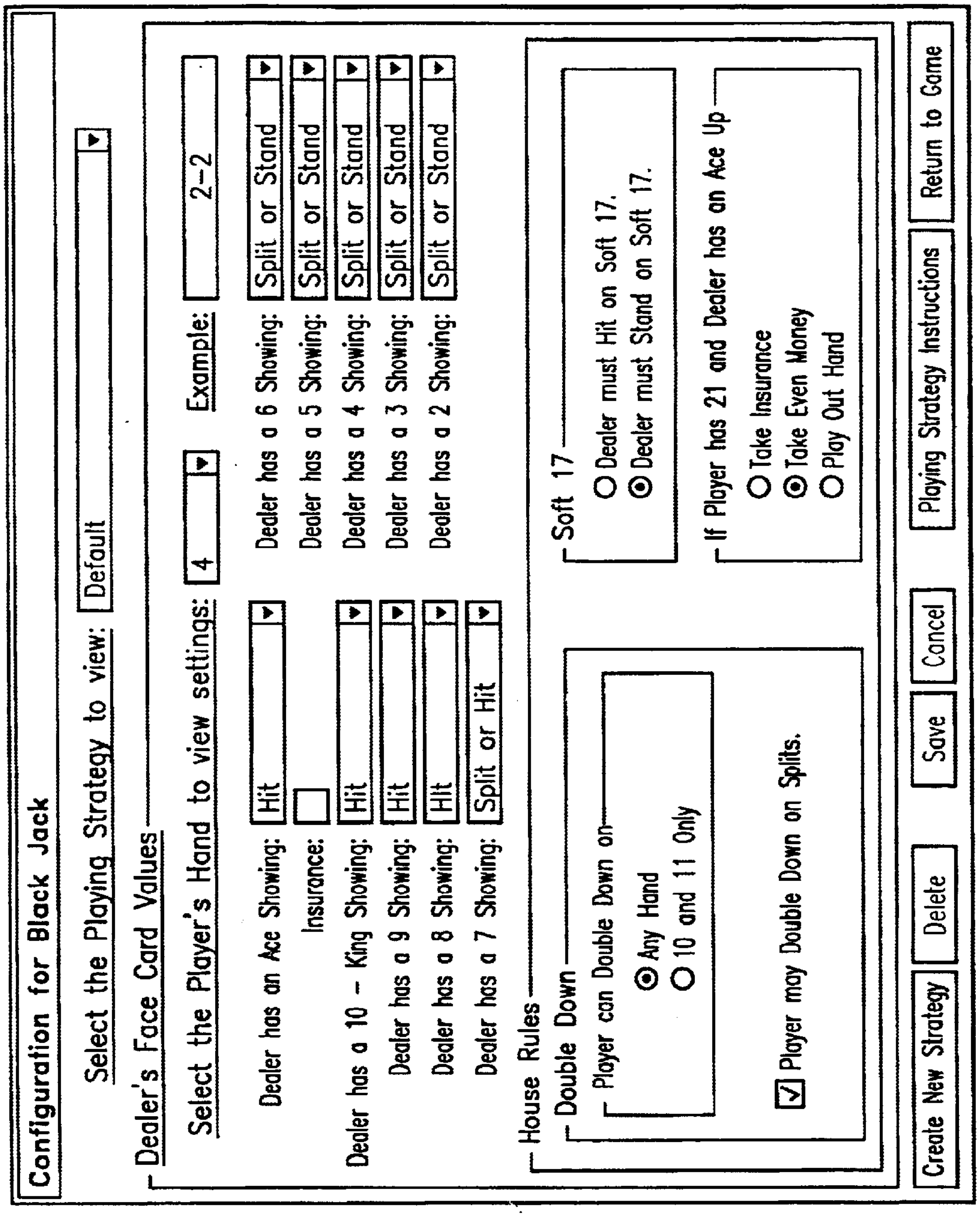
FIG. 23 is a fourth screen display of the blackjack game of the gaming simulation program which is a game configuration screen for adjusting playing strategies.
Figure 24:
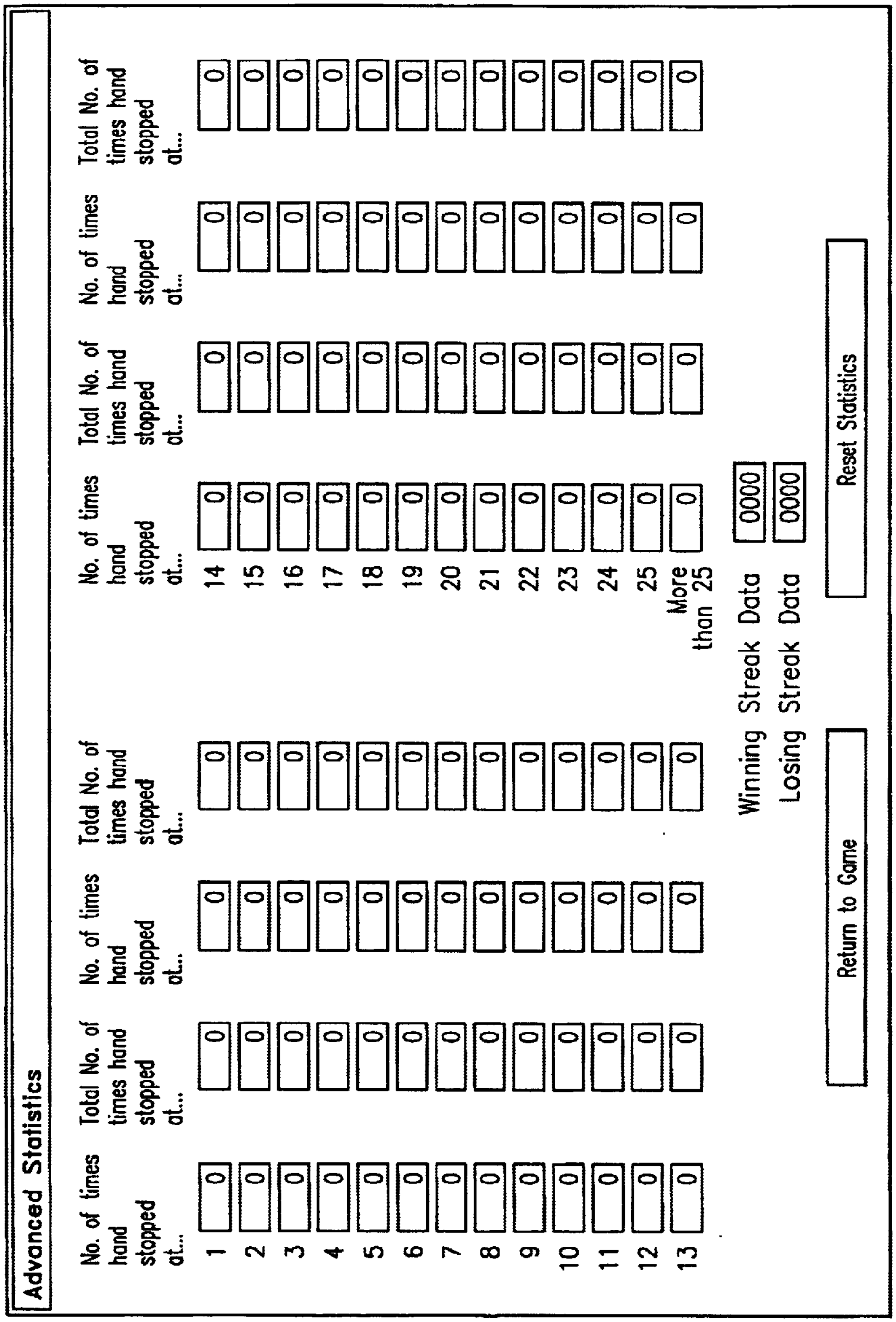
FIG. 24 is a fifth screen display of the blackjack game of the gaming simulation program which is an advanced statistic display.
Figure 25:
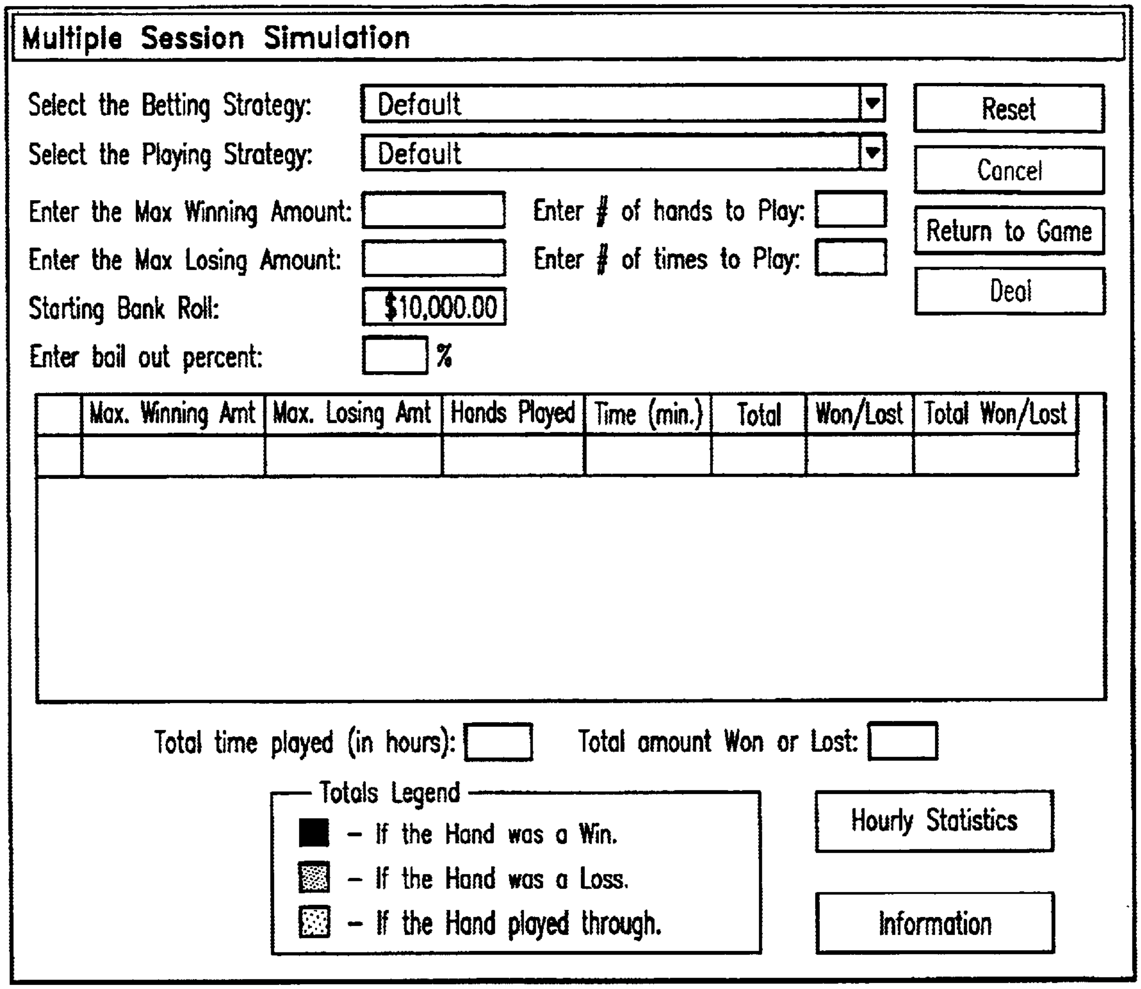
FIG. 25 is a sixth screen display of the blackjack game of the gaming simulation program which is a multiple session simulation display.
Figure 26:
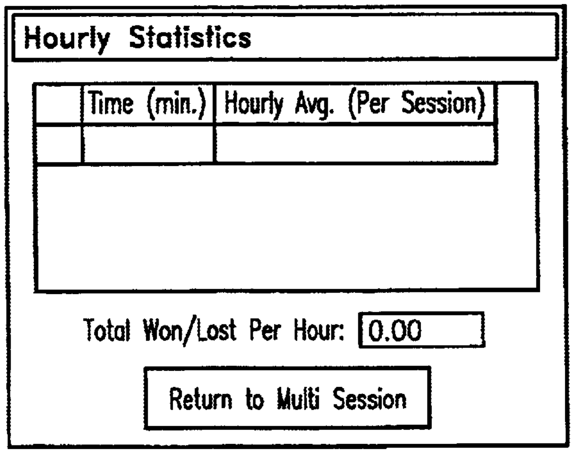
FIG. 26 is a seventh screen display of the blackjack game of the gaming simulation program which is an hourly statistics summary of a game.

The screen shown in FIG. 23 is a configuration for blackjack in which various playing strategies may be selected. On this screen, for a default playing strategy, the player's action in response to his own hand and the card which the dealer has shown is displayed. That action may be to hit, stand, or split. Similar strategies for action in response to the dealer's face card are also shown on a "no bust" strategy, that is one in which the player would not have a total greater than 21. Such actions for the default strategy are shown on Table V. Such actions on the "no bust" strategy are shown on Table VI. On these Tables V and IV, "+1" means to take a card while the other abbreviations are shown in Table VII which also shows the possible actions for each possible one of the player's hands. For each of these situations, the player's hand and the action in response to the dealer's face card may be adjusted. The player may also select whether or not to take insurance. On this screen, house rules are also displayed and may be adjusted. That is, the player can elect to double down on any hand or on 10 and 11 only. The player may elect to double down on splits or not to double down on splits. House rules may be elected to either that the dealer must stand on the soft 17 or that the dealer must hit a soft 17. If a player has 21 and the dealer has an ace up, it can also be elected either could take insurance, take even money, or play out the hand. From the game screen shown in FIG. 22 an advanced statistics display screen as shown in FIG. 24 may be selected. A multiple session simulation screen as shown in FIG. 25 may also be selected from the game screen shown in FIG. 22. From the multiple session simulation screen shown in FIG. 25 an hourly statistics summary screen as shown in FIG. 26 may also be selected.

The use of the gaming simulation program of the present invention is further illustrated with reference to the following examples.

EXAMPLE 1

The war game module was selected as described above. A "no surrender" playing strategy and a default streak betting strategy as described above were used. A single hand deal was selected and five hands were played. The results of these hands are shown in Table I.

EXAMPLE 2

The war game module again was again selected. A surrender playing strategy was elected. A default betting strategy was also selected. Five hands were played in which a single hand deal was selected. The results of the hands are shown in Table II.

EXAMPLE 3–6

In these examples, the war game was again played. The following betting and playing strategies were selected.

Example 3: streak, no surrender

Example 4: streak, surrender

Example 5: variable, no surrender

Example 6: variable, surrender

For each of these examples, 50 hands were played. The cumulative results of these hands are shown in Table IX.

EXAMPLE 7

The multiple session simulation for the war game was selected. The starting bank roll was 10,000. A streak betting and a no surrender default strategy was selected. Maximum winning and losing amounts were $1,000 and the bank out percent was 170. The number of hands to play was 5, and the number of times to play was 5. The results of these hands were compiled and are shown in Table X. Hourly statistics were compiled using this simulation and are shown in Table XI.

EXAMPLE 8

In this example, the blackjack simulation was used. The default playing strategy and streak betting strategies were selected. House rules selected were that a player may double down on any hand, a player may double down on splits, the dealer must stand on a soft 17. If a player has 21 and a dealer has an ace up, the player also will take even money. Continuous dealing was selected and the number of hands to play was set at 1,000. The results of this simulation of 1,000 hands were compiled and are shown in Table XII.

EXAMPLES 9–12

The simulation of Example 8 was repeated four times for 1,000 hands each except that the following changes were made from Example 8 in either playing strategy or in house rules, while the same streak betting strategy was maintained.

Example 9: the "no bust" playing strategy was used.

Example 10: house rules were that player may double down on 10 and 11 only.

Example 11: house rules were that dealer must hit on a soft 17.

Example 12: player takes insurance if player has 21 and dealer has an ace up.

The results of these simulations were compiled and are shown in Table XII.

EXAMPLE 13

In this example, the blackjack simulation was used. The default playing strategy and variable betting strategies were selected. House rules selected were that a player may double down on any hand, a player may double down on splits, the dealer must stand on a soft 17. If a player has 21 and a dealer has an ace up, the player also will take even money. Continuous dealing was selected and the number of hands to play was set at 1,000. The results of this simulation of 1,000 hands were compiled and are shown in Table XIII.

EXAMPLES 14–17

The simulation of Example 8 was repeated four times for 1,000 hands each except that the following changes were made from Example 8 in either playing strategy or in house rules, while the same streak betting strategy was maintained.

Example 14: the "no bust" playing strategy was used.

Example 15: house rules were that player may double down on 10 and 11 only.

Example 16: house rules were that dealer must hit on a soft 17.

Example 17: player takes insurance if player has 21 and dealer has an ace up.

The results of these simulations were compiled and are shown in Table XIII.

EXAMPLE 18

The multiple session simulation for the blackjack game was selected. The starting bank roll was 10,000. A streak betting and a no surrender default strategy was selected. Maximum winning and losing amounts were $850 and the bank out percent was 170. The number of hands to play was 5, and the number of times to play was 5. The results of these hands were compiled and are shown in Table XVI. Hourly statistics were compiled using this simulation and are shown in Table XVII.

It will be appreciated that a gaming program and method of its use has been provided which allows the user to select between different games of chance and, for a selective game of chance, to further select a betting strategy from a set of betting strategies, and a playing strategy from a set of playing strategies and to simulate a playing of hands using the selecting playing and betting strategies.

It will also be appreciated that a gaming program and method of its use has been provided which displays comprehensive statistics to enable the user to determine the results of the simulation of the plurality of hands using a selective betting and playing strategy to enable the user to determine the relative merits of the selected strategies, these are the other strategies.

If will also be appreciated that a gaming program and a method of its use has been provided which affords the above advantages while being relatively inexpensive and easy to use.

It will also be appreciated that a gaming program and a method of its use has been provided which enables a user to be taught various strategies in playing war, blackjack and other games of chance and to further enable the user to enhance his skill in employing such strategies and techniques.

While the invention has been described here in its currently preferred embodiment or embodiments, those skilled in the art will recognize that other modifications may be made without departing from the invention and it is intended to claim all modifications and variations as fall within the scope of the invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

TABLE I

War Game Configuration

| Playing Strategy | Surrender | Deck in Shoe | Winning Sequence | Losing Sequence |
|---|---|---|---|---|
| Default | yes/no | 1 | 5 | 5 |
| Dealer won't win 4 in a row | yes/no | 8 | 1 | 5 |
| Plan on winning first 2 hands | yes/no | 8 | 3 | 1 |

TABLE II

War Game Betting Strategies

| Playing Strategy | Streak | 1 | 2 | 3 | 4 | 5 |
|---|---|---|---|---|---|---|
| Default | W | 5 | 10 | 20 | 30 | 40 |
| | L | 5 | 10 | 20 | 30 | 40 |
| Dealer won't win 4 | W | 5 | — | — | — | — |
| in a row | L | 5 | 5 | 5 | 25 | 5 |
| Plan on winning | W | 50 | 25 | 5 | — | — |
| first 2 hands | L | 5 | — | — | — | — |

TABLE III

Blackjack Game Configuration

| Playing Strategy | Deck in Shoe | Winning Sequence | Losing Sequence |
|---|---|---|---|
| Default | 8 | 5 | 5 |
| Dealer won't win 4 in a row | 8 | 1 | 5 |
| Plan on winning first 2 hands | 1 | 3 | 1 |
| 5 & 5, 10, 20 | 8 | 1 | 7 |

TABLE IV

Blackjack Betting Strategies

| | | Winning/Losing Streak Length | | | | | | |
|---|---|---|---|---|---|---|---|---|
| Playing Strategy | | 1 | 2 | 3 | 4 | 5 | 6 | 7 |
| Default | W | 5 | 10 | 15 | 20 | 25 | — | — |
| | L | 5 | 10 | 15 | 20 | 25 | — | — |
| Dealer won't win 4 | W | 5 | — | — | — | — | — | — |
| in a row | L | 5 | 5 | 5 | 25 | 5 | — | — |
| Plan on winning | W | 50 | 25 | 5 | — | — | — | — |
| first 2 games | L | 5 | — | — | — | — | — | — |
| 5 & 5, 10, 20 | W | 5 | — | — | — | — | — | — |
| | L | 5 | 10 | 20 | 40 | 80 | 160 | 7 |

TABLE V

Blackjack Default Playing Strategy
Player's Action Based on Dealer's Hand Showing

| Player's Hand | Example | A | Insurance | K or 10 | 9 | 8 | 7 | 6 | 5 | 4 | 3 | 2 |
|---|---|---|---|---|---|---|---|---|---|---|---|---|
| 4 | 2-2 | H | | H | H | H | SP/H | SP/ST | SP/ST | SP/ST | SP/ST | SP/ST |
| 5 | 2-3 | H | | H | H | H | H | H | H | H | H | H |
| 6 | 3-3<br>3-4 | H | | H | H | H | SP/H | SP/ST | SP/ST | SP/ST | SP/ST | SP/ST |
| 7 | 2-5 | H | | H | H | H | H | H | H | H | H | H |
| 8 | 4-4<br>3-5 | H | | H | H | H | H | H | H | H | H | H |
| 9 | 3-6 | H | | H | H | H | H | H | H | H | H | H |
| 10 | 5-5<br>4-6 | H | | H | H | DD | DD | DD | DD | DD | DD | DD |
| 11 | 5-6 | H | | H | H | DD | DD | DD | DD | DD | DD | DD |
| 12 | 6-6<br>5-4-3 | H | | H | H | H | H | ST | SP/ST | ST | ST | ST |
| Soft 12 | A-A | SP + 1 | | SP + 1 | SP + 1 | SP + 1 | SP + 1 | SP + 1 | SP + 1 | SP + 1 | SP + 1 | SP + 1 |
| 13 | J-3 | H | | H | H | H | H | ST | ST | ST | ST | ST |
| Soft 13 | A-Z | H | | H | H | H | H | H | H | H | H | H |
| 14 | 7-7<br>k-4 | H | | H | H | H | SP/H | SP/H | SP/H | SP/H | SP/H | SP/H |

TABLE V-continued

Blackjack Default Playing Strategy
Player's Action Based on Dealer's Hand Showing

| Player's Hand | Example | A | Insurance | K or 10 | 9 | 8 | 7 | 6 | 5 | 4 | 3 | 2 |
|---|---|---|---|---|---|---|---|---|---|---|---|---|
| Soft 14 | A-3 | H | | H | H | H | H | H | H | H | H | H |
| 15 | 7-8 | H | | H | H | H | ST | ST | ST | ST | ST | ST |
| | 3-2-Q | | | | | | | | | | | |
| Soft 15 | A-4 | H | | H | H | H | H | H | H | H | H | H |
| 16 | 8-8 | H | | H | H | SP/H | SP/H | SP/ST | SP/ST | SP/ST | SP/ST | SP/ST |
| | K-4-2 | | | | | | | | | | | |
| Soft 16 | AJ | H | | H | H | H | H | H | H | H | H | H |
| 17 | J-7 | ST | | ST | ST | ST | ST | ST | ST | ST | ST | ST |
| | 4-5-6 | | | | | | | | | | | |
| Soft 17 | A-6 | H | | H | H | H | H | H | H | H | H | H |
| 18 | 9-9 | ST | | ST | ST | ST | ST | ST | ST | ST | ST | ST |
| | K-8 | | | | | | | | | | | |
| Soft 18 | A7 | ST | | ST | ST | ST | ST | ST | ST | ST | ST | ST |
| 19 | 9-J | ST | | ST | ST | ST | ST | ST | ST | ST | ST | ST |
| | 3-5-A | | | | | | | | | | | |
| Soft 19 | A8 | ST | | ST | ST | ST | ST | ST | ST | ST | ST | ST |
| 20 | K-K | ST | | ST | ST | ST | ST | ST | ST | ST | ST | ST |
| | A-4-5 | | | | | | | | | | | |
| Soft 20 | A-9 | ST | | ST | ST | ST | ST | ST | ST | ST | ST | ST |

TABLE VI

Blackjack "No Bust" Playing Strategy
Player's Action Based on Dealer's Hand Showing

| Player's Hand | Example | A | Insurance | K or 10 | 9 | 8 | 7 | 6 | 5 | 4 | 3 | 2 |
|---|---|---|---|---|---|---|---|---|---|---|---|---|
| 4 | 2-2 | H | yes | H | H | H | SP/H | SP/ST | SP/ST | SP/ST | SP/ST | SP/ST |
| 5 | 2-3 | H | | H | H | H | H | H | H | H | H | H |
| 6 | 3-3 | | | | | | | | | | | |
| | 3-4 | H | | H | H | H | SP/H | SP/ST | SP/ST | SP/ST | SP/ST | SP/ST |
| 7 | 2-5 | H | | H | H | H | H | H | H | H | H | H |
| 8 | 4-4 | | | | | | | | | | | |
| | 3-5 | H | | H | H | H | H | H | H | H | H | H |
| 9 | 3-6 | H | | H | H | H | H | H | H | H | H | H |
| 10 | 5-5 | | | | | | | | | | | |
| | 4-6 | H | | H | H | DD | DD | DD | DD | DD | DD | DD |
| 11 | 5-6 | H | | H | H | DD | DD | DD | DD | DD | DD | DD |
| 12 | 6-6 | | | | | | | | | | | |
| | 5-4-3 | ST | | ST | ST | ST | ST | ST | SP/ST | ST | ST | ST |
| Soft 12 | A-A | SP + 1 | | SP + 1 | SP + 1 | SP + 1 | SP + 1 | SP + 1 | SP + 1 | SP + 1 | SP + 1 | SP + 1 |
| 13 | J-3 | H | | H | H | H | H | ST | ST | ST | ST | ST |
| Soft 13 | A-Z | H | | H | H | H | H | H | H | H | H | H |
| 14 | 7-7 | | | | | | | | | | | |
| | k-4 | SP/ST | | SP/ST | SP/ST | SP/ST | SP/ST | SP/ST | SP/ST | SP/ST | SP/ST | SP/ST |
| Soft 14 | A-3 | H | | H | H | H | H | H | H | H | H | H |
| 15 | 7-8 | | | | | | | | | | | |
| | 3-2-Q | H | | H | H | H | ST | ST | ST | ST | ST | ST |
| Soft 15 | A-4 | H | | H | H | H | H | H | H | H | H | H |
| 16 | 8-8 | | | | | | | | | | | |
| | K-4-2 | SP/ST | | SP/ST | SP/ST | SP/ST | SP/ST | SP/ST | SP/ST | SP/ST | SP/ST | SP/ST |
| Soft 16 | AJ | H | | H | H | H | H | H | H | H | H | H |
| 17 | J-7 | | | | | | | | | | | |
| | 4-5-6 | ST | | ST | ST | ST | ST | ST | ST | ST | ST | ST |
| Soft 17 | A-6 | H | | H | H | H | H | H | H | H | H | H |
| 18 | 9-9 | | | | | | | | | | | |
| | K-8 | ST | | ST | ST | ST | ST | ST | ST | ST | ST | ST |
| Soft 18 | A7 | ST | | ST | ST | ST | ST | ST | ST | ST | ST | ST |
| 19 | 9-J | | | | | | | | | | | |
| | 3-5-A | ST | | ST | ST | ST | ST | ST | ST | ST | ST | ST |
| Soft 19 | A8 | ST | | ST | ST | ST | ST | ST | ST | ST | ST | ST |
| 20 | K-K | | | | | | | | | | | |
| | A-4-5 | ST | | ST | ST | ST | ST | ST | ST | ST | ST | ST |
| Soft 20 | A-9 | ST | | ST | ST | ST | ST | ST | ST | ST | ST | ST |

TABLE VII

| Alternative Strategies for Blackjack |
|---|
| If player's hand is: 4, 8, 10, 12, 14, 16, 18, or 20 |
| Possible actions are: |
| Hit (H) |
| Stand (ST) |
| Double Down (DD) |
| Split or Hit (SP/H) |
| Split or Stand (SP/ST) |
| Split or Double Down (SP/DD) |
| If player's hand is: 5, 6, 7, 9, 11, 13, soft 13, 14, soft 14, 15, soft 15, soft 16, 17, soft 17, soft 18, 19, soft 19, soft 20 |
| Possible Actions are: |
| Hit (H) |
| Stand (ST) |
| Double Down (DD) |
| If player's hand is: soft 12 |
| Possible actions are: |
| Hit (H) |
| Stand (ST) |
| Double Down (DD) |
| Split or Hit (SP/H) |
| Split or Stand (SP/ST) |
| Split or Double Down (SP/DD) |

TABLE VIII

| Alternative House Rules for Blackjack |
|---|
| Double Down |
| Player can double down on: |
| any hand |
| 10 and 11 only |
| Player may double down on splits |
| Soft 17 |
| Dealer must hit on soft 17 |
| Dealer must stand on soft 17 |
| If a player has 21 and dealer has an ace up: |
| Take insurance |
| Take even money |
| Play on the hand |

TABLE IX

Example 1: Play of War Game With No Surrender Playing and Streak Betting Strategy

| | Dealer<br>Player | AH<br>KV | 10C<br>AC | AD<br>6D | 3D<br>JH | 3S<br>2H | 6S<br>7H |
|---|---|---|---|---|---|---|---|
| Bankroll data | | | | | | | |
| Current bankroll | 10,000 | 9,695 | 10,005 | 9,995 | 10,000 | 9,995 | 10,000 |
| Maximum bankroll | 0 | 0 | 10,005 | 10,005 | 10,005 | 10,005 | 10,005 |
| Minimum bankroll | 0 | 9,995 | 9,995 | 9,995 | 9,995 | 9,995 | 9,995 |
| Total Won on War | 0 | 0 | 0 | 0 | 0 | 0 | 0 |
| Total Loss on war | 0 | 0 | 0 | 0 | 0 | 0 | 0 |
| Total Hand Data | | | | | | | |
| Total hands won | 0 | 0 | 1 | 1 | 2 | 2 | 3 |
| Total hands lost | 0 | 1 | 1 | 2 | 2 | 3 | 3 |
| Total wars won | 0 | 0 | 0 | 0 | 0 | 0 | 0 |
| Total wars lost | 0 | 0 | 0 | 0 | 0 | 0 | 0 |
| Total wars | 0 | 0 | 0 | 0 | 0 | 0 | 0 |
| Win/Loss Streak Data | | | | | | | |
| Current winning streak | 0 | 0 | 1 | 0 | 1 | 0 | 1 |
| Current losing streak | 0 | 1 | 0 | 1 | 0 | 1 | 0 |
| Current Bet | 5 | 10 | 10 | 5 | 5 | 5 | 5 |
| Maximum winning streak | 0 | 0 | 1 | 1 | 1 | 1 | 1 |
| Maximum losing streak | 0 | 1 | 1 | 1 | 1 | 1 | 1 |

TABLE X

Example 2: Play of War Games With War Surrender Playing and Variable Betting Strategy

| | Dealer<br>Player | 8D<br>4C | 9H<br>KD | ZS<br>AD | QS<br>7C | Z<br>10 | AD<br>3H |
|---|---|---|---|---|---|---|---|
| Bankroll data | | | | | | | |
| Current bankroll | 10,000 | 9,990 | 10,010 | 10,040 | 10,000 | 10,050 | 10,000 |
| Maximum bankroll | 0 | 0 | 10,010 | 10,040 | 10,040 | 10,050 | 10,050 |
| Minimum bankroll | 0 | 9,990 | 9,990 | 9,990 | 9,990 | 9,990 | 9,990 |
| Total Won on War | 0 | 0 | 0 | 0 | 0 | 0 | 0 |
| Total Loss on war | 0 | 0 | 0 | 0 | 0 | 0 | 0 |

TABLE X-continued

Example 2: Play of War Games With War Surrender Playing and Variable Betting Strategy

| | Dealer<br>Player | 8D<br>4C | 9H<br>KD | ZS<br>AD | QS<br>7C | Z<br>10 | AD<br>3H |
|---|---|---|---|---|---|---|---|
| Total Hand Data | | | | | | | |
| Total hands won | 0 | 0 | 1 | 2 | 2 | 3 | 3 |
| Total hands lost | 0 | 1 | 1 | 1 | 2 | 2 | 3 |
| Total wars won | 0 | 0 | 0 | 0 | 0 | 0 | 0 |
| Total wars lost | 0 | 0 | 0 | 0 | 0 | 0 | 0 |
| Total wars | 0 | 0 | 0 | 0 | 0 | 0 | 0 |
| Win/Loss Streak Data | | | | | | | |
| Current winning streak | 0 | 0 | 1 | 2 | 0 | 1 | 0 |
| Current losing streak | 0 | 1 | 0 | 0 | 1 | 0 | 1 |
| Current Bet | 5 | 20 | 30 | 40 | 50 | 50 | 10 |
| Maximum winning streak | 0 | 0 | 1 | 2 | 2 | 2 | 2 |
| Maximum losing streak | 0 | 1 | 1 | 1 | 1 | 1 | 1 |

TABLE XI

Examples of War Game Play With Various Strategies

| | Example 3 | Example 4 | Example 5 | Example 6 |
|---|---|---|---|---|
| Bankroll data | | | | |
| Current bankroll | 10,000 | 9,972.50 | 10,000 | 10,005 |
| Maximum bankroll | 10,005 | 10,032.50 | 10,104 | 10,185 |
| Minimum bankroll | 9,930 | 9,920 | 9,900 | 9,932 |
| Total Won on War | 10 | 0 | 150 | 0 |
| Total Loss on war | 20 | 52.56 | 80 | 45 |
| Total Hand Data | | | | |
| Total hands won | 25 | 21 | 26 | 25 |
| Total hands lost | 25 | 21 | 24 | 22 |
| Total wars won | 1 | 0 | 5 | 0 |
| Total wars lost | 1 | 8 | 3 | 3 |
| Total wars | 2 | 0 | 8 | 0 |
| Win/Loss Streak Data | | | | |
| Current winning streak | 1 | 1 | 1 | 2 |
| Current losing streak | 0 | 0 | 0 | 0 |
| Current Bet | 5 | 5 | 20 | 50 |
| Maximum winning streak | 5 | 4 | 4 | 6 |
| Maximum losing streak | 5 | 6 | 5 | 3 |

TABLE XIII

Example 7: War Game Hourly Statistics

| Play | Time (Min.) | Hourly Avg. (Per Session) |
|---|---|---|
| 1 | 00:02 | 0.00 |
| 2 | 00:02 | 450.00 |
| 3 | 00:02 | −1,500.00 |
| 4 | 00:02 | −150.00 |
| 5 | 00:02 | 150.00 |
| | Total Won/Lost Per Hour—$262.50 | |

TABLE XII

Example 7: War Game Session Simulation

| Play | Maximum Winning Amount | Maximum Losing Amount | Hands Played | Time (Min.) | Total | Won/Lost | Total Won/Lost |
|---|---|---|---|---|---|---|---|
| 1 | 5.00 | −5.00 | 5 | 00:02 | 10,000.00 | 0.00 | 0.00 |
| 2 | 15.00 | −10.00 | 5 | 00:02 | 10,015.00 | 15.00 | 15.00 |
| 3 | 0.00 | −50.00 | 5 | 00:02 | 9,965.00 | −50.00 | −35.00 |
| 4 | 5.00 | −5.00 | 5 | 00:02 | 9,960.00 | −5.00 | −40.00 |
| 5 | 5.00 | −15.00 | 5 | 00:02 | 9,965.00 | 5.00 | −35.00 |

TABLE XIV

| Examples of Blackjack Games Play With Various Strategies | Example 8 | Example 9 | Example 10 | Example 11 | Example 12 |
|---|---|---|---|---|---|
| Bankroll data | | | | | |
| Current bankroll | 10,125 | 9,835 | 10,400 | 10,140 | 9667.50 |
| Maximum bankroll | 10,340 | 10,085 | 10,425 | 10,265 | 10,067.50 |
| Minimum bankroll | 9,905 | 9602.50 | 9,815 | 4,947.50 | 9,597.50 |
| Amount won/lost on hand | −5 | tie | 5 | −5 | 0 |
| Amount won on even money | 0 | 0 | 0 | 0 | 0 |
| Total Hand Data | | | | | |
| Total hands won | 429 | 437 | 446 | 436 | 427 |
| Total hands lost | 474 | 487 | 464 | 478 | 479 |
| Total blackjack won | 50 | 45 | 45 | 52 | 49 |
| Amount won on Blackjack | 690 | 660 | 615 | 690 | 667.50 |
| Win/Loss Streak Data | | | | | |
| Current winning streak | 0 | 1 | 2 | 0 | 1 |
| Current losing streak | 2 | 0 | 0 | 1 | 0 |
| Current push streak | 0 | 1 | 0 | 0 | 0 |
| Current Bet | 10 | 5 | 10 | 5 | 5 |
| Maximum winning streak | 10 | 7 | 8 | 8 | 8 |
| Maximum losing Streak | 10 | 9 | 7 | 8 | 9 |

TABLE XV

| Examples of Blackjack Games Play With Various Strategies | Example 13 | Example 14 | Example 15 | Example 16 | Example 17 |
|---|---|---|---|---|---|
| Bankroll data | | | | | |
| Current bankroll | 8,427.50 | 8,952.50 | 9,277.50 | 9,020 | 9,282.50 |
| Maximum bankroll | 10,050 | 10,740 | 10,490 | 11,455 | 11,257.50 |
| Minimum bankroll | 8,335 | 8,947.50 | 8,662.50 | 8,945 | 9,282.50 |
| Amount won/lost on hand | −40 | 5 | 15 | 25 | −10 |
| Amount won on even money | 0 | 0 | 0 | 0 | 0 |
| Total Hand Data | | | | | |
| Total hands won | 433 | 436 | 420 | 424 | 429 |
| Total hands lost | 475 | 490 | 498 | 499 | 468 |
| Total blackjack won | 35 | 58 | 43 | 42 | 36 |
| Amount won on Blackjack | 1,597.50 | 2,947.50 | 2,467.50 | 1,845 | 2,392.50 |
| Win/Loss Streak Data | | | | | |
| Current winning streak | 0 | 1 | 2 | 2 | 0 |
| Current losing streak | 2 | 0 | 0 | 0 | 1 |
| Current push streak | 0 | 0 | 0 | 0 | 0 |
| Current Bet | 35 | 10 | 20 | 30 | 5 |
| Maximum winning streak | 9 | 9 | 8 | 6 | 7 |
| Maximum losing Streak | 9 | 9 | 9 | 11 | 9 |

TABLE XVI

Example 18: Blackjack - Session Simulation

| Play | Maximum Winning Amount | Maximum Losing Amount | Hands Played | Time (Min.) | Total | Won/Lost | Total Won/Lost |
|---|---|---|---|---|---|---|---|
| 1 | 0.00 | −20.00 | 5 | 00:02 | 9,995.00 | −5.00 | −5.00 |
| 2 | 40.00 | −5.00 | 5 | 00:02 | 10,005.00 | 40.00 | 35.00 |
| 3 | 10.00 | 0.00 | 5 | 00:02 | 10,400.00 | 5.00 | 40.00 |
| 4 | 0.00 | −20.00 | 5 | 00:02 | 10,020.00 | −20.00 | 20.00 |
| 5 | 10.00 | −10.00 | 5 | 00:02 | 10,025.00 | 50.00 | 23.00 |

TABLE XVII

Example 18: Blackjack Game—Hourly Statistics

| Play | Time (Min.) | Hourly Avg. (Per Session) |
|---|---|---|
| 1 | 00:02 | −150.00 |
| 2 | 00:02 | 1,200.00 |
| 3 | 00:02 | 150.00 |
| 4 | 00:02 | −600.00 |
| 5 | 00:02 | 150.00 |
| | | Total Won/Lost Per Hour—$187.50 |

What is claimed is:

1. A computer program for simulating multiple rounds of a game of chance wherein each round results in a user of the program either winning the round or losing the round, the computer program comprising:

(a) a gaming module; said gaming module including a user interface for inputting a betting strategy and a playing strategy;

(b) the betting strategy including selection of a set of betting amounts for winning streaks of a plurality of different lengths and selection of a set of betting amounts for losing streaks of a plurality of different lengths and for adding to or subtracting from a betting amount depending on whether a hand is a winning hand or a losing hand; and (c) the playing strategy including selection of a decision rule indicative of how a round will be played when a particular event occurs during simulation of a round that would require a user to make a decision as to how to proceed in playing the round;

(d) a simulation module for the simulation of multiple rounds of the game of chance in a short period of time; each of the multiple rounds of the game being based on a particular selection of a betting and playing strategy;

(e) a statistics module for displaying the outcomes of the multiple rounds of the game of chance; wherein analysis of the display enables the user to learn the statistically likely outcome of the particular selection of the betting and playing strategy so as to be able to apply that learned knowledge to a later played actual game of chance.

2. The computer program of claim 1, wherein the statistics module additionally displays the statistics of the rounds of the game of chance during the simulation.

3. The computer program of claim 1 wherein the gaming module further provides for an input of an operating mode selected from the group consisting of single hand mode, automatic mode, and session mode.

4. The computer program of claim 1 wherein the gaming module further provides for an input of a number of rounds the game of chance will simulate.

5. The computer program of claim 1 wherein the gaming module further provides for an input of a speed of the rounds of the game of chance.

6. The computer program of claim 1 wherein the game of chance is war.

7. The computer program of claim 1 wherein the game of chance is blackjack.

8. The computer program of claim 1 wherein in step (c) sets of winning and losing streaks for at least three different lengths are selected.

9. A method for developing and subsequently applying a strategy for playing a game of chance, the method comprising the steps of:

(a) establishing a betting strategy by selecting a set of betting amounts for winning streaks of a plurality of different lengths and selection of a set of betting amounts for losing streaks of a plurality of different lengths or by adding to or subtracting from a betting amount depending on whether a round is a winning or losing hand;

(b) establishing a playing strategy by selecting a decision rule, indicative of how a round will be played when a particular event occurs during simulation of a round that would require a player to make a decision, other than solely a betting decision, as to how to proceed in playing the round;

(c) providing a simulation module for simulation of multiple rounds of the game of chance; the simulation module being capable of running multiple rounds of the game in a statistically short period of time (d) providing a gaming module for use with said simulation module including a user interface, and (e) inputting a particular selection of a betting strategy and a playing strategy for the game of chance into said gaming module; and (f) employing said simulation module to simulate multiple rounds of the game of chance in a statistically short period of time;

(g) determining a collection of cumulative statistics for said multiple rounds of the game of chance;

(h) analyzing the statistics to determine the statistically likely outcome of the particular selection of the betting and playing strategy; and (I) applying the particular selection of the betting and playing strategy to a later played actual game of chance.

10. The method of claim 9 wherein the statistics of the rounds of the game of chance during the simulation are displayed.

11. The method of claim 9 wherein in step (d) an operating mode selected from the group consisting of single hand mode, automatic mode, and session mode is inputted to the gaming module.

12. The method of claim 9 wherein in step (d) a number of rounds the game of chance will simulate is inputted to the gaming module.

13. The method of claim 9 wherein a speed of the rounds of the game of chance is inputted to the gaming module.

14. The method of claim 9 wherein in step (a) sets of winning and losing streaks for at least three different lengths are selected.

15. The method of claim 9 wherein the game of chance is war.

16. The method of claim 9 wherein the game of chance is blackjack.

17. The method of claim 9 wherein the method is used to teach the game of chance to the player.

18. A method for developing and subsequently applying a strategy for playing a game of war wherein each hand results in the player either winning the round or losing the round, the method comprising the steps of:

(a) establishing a betting strategy by selecting a set of betting amounts for winning streaks of a plurality of different lengths and selection of a set of betting amounts for losing streaks of a plurality of different lengths or by adding to or subtracting from a betting amount depending on whether a hand is a winning or losing hand;

(b) establishing a playing strategy by selecting decision rule, indicative of how a hand will be played when a particular event occurs during simulation of a round that would require a player to make a decision, other than solely a betting decision, as to how to proceed in playing the round;

(c) providing a simulation module for simulation of multiple rounds of the game of war;

(d) providing a gaming module for use with said simulation module including a user interface; and (e) inputting a particular selection of a betting strategy and a playing strategy for the game of war into said gaming module; and (f) employing said simulation module to simulate multiple hands of the game of war in a statistically short period of time;

(g) determining a collection of cumulative statistics for said multiple hands of the game of war;

(h) analyzing the statistics to determine the statistically likely outcome of the particular selection of the betting and playing strategy; and (I) applying the particular selection of the betting and playing strategy to a later played actual game of war.

19. The method of claim 18 further comprising the steps of compiling statistics of the hands of the game of war during the simulation and displaying the statistics at the end of the simulation.

20. The method of claim 19 wherein statistics of the hands of the game of war during the simulation are displayed.

21. The method of claim 18 wherein an operating mode selected from the group consisting of single hand mode, automatic mode, and session mode is selected.

22. The method of claim 18 wherein a number of rounds which the game of war will simulate is selected.

23. The method of claim 18 wherein a speed of the rounds of the game of war is selected.

24. The method of claim 18 wherein in step (c) sets of winning and losing streaks for at least three different lengths are selected.

25. The method of claim 18 wherein in step (d) the playing strategy includes the step of not surrendering in the event of a tie.

26. The method of claim 25 wherein in step (d) the playing strategy includes the step of surrendering in the event of a tie.

27. The method of claim 18 wherein the method is used to teach the game of war to the player.

28. A method for developing and subsequently applying a strategy for playing a game of blackjack wherein each hand results in the player either winning the hand or losing the hand, the method comprising the steps of:

(a) establishing a betting strategy either by selecting a set of betting amounts for winning streaks of a plurality of different lengths and selection of a set of betting amounts for losing streaks of a plurality of different lengths or by adding to or subtracting from a betting amount depending on whether a hand is a winning or losing hand;

(b) establishing a playing strategy by selecting decision rule, indicative of how a hand will be played when a particular event occurs during simulation of a round that would require a player to make a decision, other than solely a betting decision, as to how to proceed in playing the round;

(c) providing a simulation module for simulation of multiple rounds of the game of blackjack;

(d) providing a gaming module for use with said simulation module including a user interface;

(e) inputting a particular selection of a betting strategy and a playing strategy for the game of blackjack into said gaming module; and (f) employing said simulation module to simulate multiple rounds of the game of blackjack in a statistically short period of time;

(g) determining a collection of cumulative statistics for said multiple rounds of the game of blackjack;

(h) analyzing the statistics to determine the statistically likely outcome of the particular selection of the betting and playing strategy;

(I) applying the particular selection of the betting and playing strategy to a later played actual game of blackjack.

29. The method of claim 28 further comprising the step of compiling statistics of the rounds of the game of chance during the simulation and displaying the statistics at the end of the simulation.

30. The method of claim 29 wherein the statistics of the hands of the game of blackjack during the simulation are displayed.

31. The method of claim 28 wherein in step (d) an operating mode selected from the group consisting of single hand mode, automatic mode, and session mode is inputted to the gaming module.

32. The method of claim 28 wherein in step (d) a number of rounds the game of blackjack will simulate is inputted to the gaming module.

33. The method of claim 28 wherein a speed of the rounds of the game of blackjack is inputted to the gaming module.

34. The method of claim 28 wherein in step (a) sets of winning and losing streaks for at least three different lengths are selected.

35. The method of claim 28 wherein in step (b) the playing strategy involves the step of always avoiding a bust by the player on each of the hands.

36. The method of claim 28 wherein the playing strategy involves the player taking insurance.

37. The method of claim 28 wherein the playing strategy involves the player not taking insurance.

38. The method of claim 28 wherein a playing strategy is selected based on an assumption that the dealer will not have a winning streak which extends beyond a particular number of hands.

39. The method of claim 28 wherein a playing strategy is selected based on an assumption that the player will begin said multiple hands of the game of blackjack by winning of particular number of hands.

40. The method of claim 28 wherein in each hand the player is initially dealt two cards and the dealer is dealt one showing card and one down card, and the player's strategy provides for an action to be taken by the player for each possible combination of cards dealt to the player and including showing card dealt to the dealer.

41. The method of claim 40 wherein the actions to be taken by the player are selected from the group consisting of hit, stand, split, double down, and split and take one card.

42. The method of claim 28 wherein the game of blackjack has a plurality of alternative house rules and the player may select from said alternative house rules.

43. The method of claim 42 wherein a selection may be made from a house rule in which a player may double down on any hand or on a 10 or 11 only.

44. The method of claim 42 wherein a selection may be made from a house rule allowing a double down on splits and a house rule not allowing a double down on splits.

45. The method of claim 42 wherein a selection may be made from a house rule requiring the dealer to stand on soft 17 and a house rule requiring a dealer to hit on soft 17.

46. The method of claim 28 wherein if the player has 21 and the dealer has an ace showing, a selection may be made between taking insurance, taking even money and playing out the hands.

47. The method of claim 28 wherein the method is used to teach the player the game of blackjack.

48. A method of developing and subsequently applying a game strategy for playing a game of chance, the method comprising the steps of:

(a) providing a gaming module having a plurality of games of chance stored therein;

(b) providing a simulation module linked to the gaming module;

(c) selecting a game of chance;

(d) selecting a first betting strategy;

(e) selecting a first playing strategy;

(f) entering the first betting strategy and first playing strategy into the gaming module;

(g) running a simulation of a plurality of rounds of the game of chance in a short period of time, the rounds being based on the first betting strategy and first playing strategy, wherein each round of the game has a winning or losing outcome;

(h) gathering statistics as to the outcome of each of the rounds of the game of chance;

(i) reviewing the statistics of the outcomes of the rounds to determine whether the first betting strategy and first playing strategy will statistically tend to result in the player winning using the first betting and first playing strategy;

(j) applying the knowledge learned from the review of the statistics to a later played actual game of chance.

* * * * *